United States Patent
Fielder et al.

(10) Patent No.: US 8,757,779 B2
(45) Date of Patent: Jun. 24, 2014

(54) INKJET PRINTER HAVING PRINTHEAD AND INK FOR MINIMIZING CORROSION OF EXPOSED CORRODIBLE STRUCTURES WITHIN PRINTHEAD

(75) Inventors: Simon Fielder, Balmain (AU); Michele Gimona, Balmain (AU); Katja Johanna Digweed, Balmain (AU); Lakshmi Channarayapatna, Balmain (AU)

(73) Assignee: ZAMTEC Ltd, Dublin (IE)

( * ) Notice: Subject to any disclaimer, the term of this patent is extended or adjusted under 35 U.S.C. 154(b) by 76 days.

(21) Appl. No.: 13/469,089

(22) Filed: May 11, 2012

(65) Prior Publication Data

US 2012/0287207 A1    Nov. 15, 2012

Related U.S. Application Data

(60) Provisional application No. 61/485,600, filed on May 12, 2011.

(51) Int. Cl.
*B41J 2/05* (2006.01)
*G01D 11/00* (2006.01)

(52) U.S. Cl.
USPC ............................................ 347/63; 347/100

(58) Field of Classification Search
USPC ................................................... 347/63, 100
See application file for complete search history.

(56) References Cited

U.S. PATENT DOCUMENTS

2002/0191062 A1  12/2002  Bruinsma et al.
2004/0179066 A1   9/2004  Arita et al.
2010/0271448 A1  10/2010  Yue

OTHER PUBLICATIONS

International Search Report for PCT/AU2012/000502 issued Jun. 27, 2012, 4 pages.

*Primary Examiner* — Lisa M Solomon
(74) *Attorney, Agent, or Firm* — Cooley LLP

(57) ABSTRACT

An inkjet printer includes: an inkjet printhead having an exposed corrodible structure containing silicon nitride, borophosphosilicate glass (BPSG) or silicon oxide; and an ink reservoir containing said ink which is in fluid communication with said printhead. The ink includes: water; a dye; and a metal additive for minimizing corrosion of the exposed structure.

12 Claims, 7 Drawing Sheets

INKJET PRINTER HAVING PRINTHEAD AND INK FOR MINIMIZING CORROSION OF EXPOSED CORRODIBLE STRUCTURES WITHIN PRINTHEAD

FIELD OF THE INVENTION

This invention relates to inkjet inks for inkjet printers. It has been developed primarily for minimizing corrosion of corrodible structures in printheads by dye-based inkjet inks.

CROSS REFERENCES

The following patents or patent applications filed by the applicant or assignee of the present invention are hereby incorporated by cross-reference.

| | | | | |
|---|---|---|---|---|
| 6,755,509 | 7,222,943 | 7,188,419 | 7,168,166 | 7,086,719 |
| 12/246,332 | 12/246,336 | 7,246,886 | 7,128,400 | 7,108,355 |
| 6,991,322 | 7,287,836 | 7,118,197 | 10/728,784 | 7,364,269 |
| 7,077,493 | 6,962,402 | 10/728,803 | 7,147,308 | 10/728,779 |
| 7,118,198 | 7,168,790 | 7,172,270 | 7,229,155 | 6,830,318 |
| 7,195,342 | 7,175,261 | 7,465,035 | 7,108,356 | 7,118,202 |
| 10/773,186 | 7,134,744 | 7,134,743 | 7,182,439 | 7,210,768 |
| 7,465,036 | 7,134,745 | 7,156,484 | 7,118,201 | 7,111,926 |
| 7,431,433 | 7,401,901 | 7,468,139 | 11/744,885 | 11/097,308 |
| 7,328,978 | 7,334,876 | 7,147,306 | 7,448,734 | 7,425,050 |
| 11/014,764 | 11/014,763 | 7,331,663 | 7,360,861 | 7,328,973 |
| 7,427,121 | 7,407,262 | 7,303,252 | 7,249,822 | 11/014,762 |
| 7,311,382 | 7,360,860 | 7,364,257 | 7,390,075 | 7,350,896 |
| 7,429,096 | 7,384,135 | 7,331,660 | 7,416,287 | 11/014,737 |
| 7,322,684 | 7,322,685 | 7,311,381 | 7,270,405 | 7,303,268 |
| 7,470,007 | 7,399,072 | 7,393,076 | 11/014,750 | 11/014,749 |
| 7,249,833 | 11/014,769 | 11/014,729 | 7,331,661 | 11/014,733 |
| 7,300,140 | 7,357,492 | 7,357,493 | 11/014,766 | 7,380,902 |
| 7,284,816 | 7,284,845 | 7,255,430 | 7,390,080 | 7,328,984 |
| 7,350,913 | 7,322,671 | 7,380,910 | 7,431,424 | 7,470,006 |
| 11/014,732 | 7,347,534 | 7,441,865 | 7,469,989 | 7,367,650 |
| 7,469,990 | 11/688,863 | 11/688,864 | 11/688,865 | 7,364,265 |
| 11/741,766 | 12/014,767 | 12/014,768 | 12/014,769 | 12/014,770 |
| 12/014,771 | 12/014,772 | 12/049,371 | 12/049,372 | 12/049,373 |
| 12/146,399 | 12/334,519 | 12/339,039 | 12/557,517 | 12/613,404 |
| 12/546,682 | 12/062,514 | 7,887,170 | 7,416,280 | 6,902,255 |
| 6,623,101 | 6,406,129 | 6,505,916 | 6,457,809 | 6,550,895 |
| 6,457,812 | 11/607,976 | 7,735,970 | 7,901,046 | 7,794,613 |
| 7,938,974 | 7,568,787 | 11/946,840 | 12/323,471 | 12/508,564 |
| 12/142,779 | 12/142,782 | | | |

BACKGROUND OF THE INVENTION

The present Applicant has developed a plethora of thermal bubble-forming printheads and thermal bend-actuated printheads. The Applicant's thermal bubble-forming printheads include those with suspended heater elements (as described in, for example, U.S. Pat. No. 6,755,509; U.S. Pat. No. 7,246,886; U.S. Pat. No. 7,401,910; and U.S. Pat. No. 7,658,977, the contents of which are incorporated herein by reference) and those with embedded heater elements (as described in, for example, U.S. Pat. No. 7,377,623; U.S. Pat. No. 7,431,431; US 2006/250453; and U.S. Pat. No. 7,491,911, the contents of which are incorporated herein by reference). The Applicant's thermal bend-actuated printheads typically have moveable paddles defined in a nozzle plate of the printhead (as described in, for example, U.S. Pat. No. 7,926,915; U.S. Pat. No. 7,669,967; and US 2011/0050806, the contents of which are incorporated herein by reference).

One characteristic of many of the Applicant's inkjet printheads is a nozzle chamber and/or a nozzle plate comprised of silicon nitride. The nozzle plate spans across an ink ejection face of the printhead and defines a roof of each nozzle chamber in the printhead. It will be appreciated that the roof of each nozzle chamber, as well as chamber sidewalls, have surfaces that are continuously in contact with ink contained in each nozzle chamber. In some printheads, the nozzle chamber roof may comprise a bi-layer of silicon nitride and silicon oxide (see, for example, U.S. Pat. No. 7,658,977 and US 2011/0050806). In these printheads, the lower silicon nitride layer has a surface which is exposed to ink in the nozzle chamber. In other printheads (e.g. U.S. Pat. No. 6,755,509), the nozzle chamber roof may consist of a mono-layer of silicon nitride.

Silicon nitride is an excellent material for use in fabricating nozzle chambers and nozzle plates in inkjet printheads. Silicon nitride has excellent mechanical robustness under high pressures, good resistance to cracking and can be deposited by PECVD, which is compatible with conventional MEMS fabrication techniques.

Notwithstanding the excellent mechanical properties of silicon nitride nozzle plates, the present Applicant has observed an apparent corrosion of silicon nitride when exposed to certain dye-based inks over prolonged periods (e.g. 6-12 months). In the Applicant's bi-layered nozzle plate structures, comprising a lower layer of silicon nitride and an upper layer of silicon oxide, an unacceptable degree of roof delamination has been observed. This delamination results in a significant reduction in print quality, especially in black ink channels where delamination is most severe. Further SEM investigation of delaminated printheads revealed that the silicon nitride layer of each roof had apparently corroded whereas the silicon oxide layer was left relatively intact. However, some corrosion of silicon oxide was also observed, albeit at a relatively slower rate of corrosion than silicon nitride.

Another characteristic of the Applicant's inkjet printheads is the integration MEMS and CMOS layers in a single printhead integrated circuit (IC), which has enabled the development of inkjet printheads having a high nozzle density using standard semiconductor fabrication techniques. In the Applicant's printhead ICs, it is necessary for ink to flow from a backside of the printhead IC, which receives ink from a molded ink manifold, to a frontside of the printhead IC containing the MEMS nozzle chambers. Therefore, the ink must pass through ink inlets defined in the CMOS layers. Clearly, if ink comes into contact with any CMOS Metal layers then this is potentially catastrophic for printhead operation.

In a typical CMOS design, a lowermost Metal 1 CMOS layer is disposed on a BPSG layer. This BPSG layer has an edge exposed to ink via the ink inlet. Although many inks do not affect this BPSG layer (or other silicon oxide layers) in the printhead IC, it has been found that some inks cause significant corrosion of the BPSG layer which is problematic for printhead longevity. Relatively slower corrosion of a CVD oxide interlayer dielectric was also observed in some instances.

From the foregoing, it will be apparent that there are a number of structures in printhead, which are potentially corrodible by exposure to dye-based inks at typical pHs (e.g. pH 6-8).

One possible solution to the corrosion problems discussed above, which is currently under investigation by the present Applicant, is to physically isolate the silicon nitride or BPSG layer from the ink. For example, the nozzle plate may be designed so that a protective barrier layer is disposed between the silicon nitride and the ink. Alternatively a protective collar may be formed around the inner surfaces of each ink inlet. However, this type of mechanical solution to the problem of corrosion has the significant drawback that it requires a more complex printhead design, as well as the development and optimization of suitable MEMS fabrication processes. On a practical level, redesigning printheads is highly undesirable, especially when optimized printhead fabrication processes are well-established and suitable for mass-production.

It would therefore be desirable to seek an alternative solution to the problem of corrosion in printheads by dye-based inks, which does not require modifying the design of the printhead.

US 2010/0271448 describes dissolution of silicates from elemental silicon in printheads and identifies high pH pigment-based inks as the cause of this dissolution. US 2010/0271448 proposes the use of trivalent aluminium for passivating native silicon surfaces and suppressing the dissolution of silicates caused by high pH pigment-based inks. Consistent with the present Applicant's observations, US 2010/0271448 reports that no dissolution of silicates is observed when silicon printhead dies are exposed to dye-based inks, and the addition of trivalent aluminium, therefore, has no effect in such systems.

SUMMARY OF THE INVENTION

In a first aspect, there is an inkjet printer comprising:
an inkjet printhead comprising at least one corrodible structure comprised of silicon nitride, borophosphosilicate glass (BPSG) or silicon oxide, the corrodible structure having a surface exposed to ink; and
an ink reservoir containing the ink, the ink reservoir being in fluid communication with the printhead,
wherein the ink comprises: water; a dye; and a metal additive for minimizing corrosion of the exposed surface, the metal additive comprising one or more metals selected from the group consisting of: Al(III), Fe(III), Fe(II), Cu(II), Cu(I), Bi(III), Cr(III), Mg(II), Sr(II), Ba(II), Ce(III), Ag(I), Al, Fe, Ce, Cu, Cr, Mg and Ag.

As used herein, the term "silicon nitride" refers to any ceramic material comprised of silicon and nitrogen. Typically, silicon nitride is deposited by PECVD and may, therefore, contain other elements, such as hydrogen and oxygen, depending on the precise deposition conditions. Nevertheless, it will be understood by those skilled in the art that ceramic materials containing, for example, silicon, nitrogen and hydrogen are all within the ambit of the term "silicon nitride". Equally, it will be understood by those skilled in the art that ceramic materials containing, for example, silicon, nitrogen and oxygen (sometimes referred to as silicon oxynitrides) are all within the ambit of the term "silicon nitride". Usually, silicon and nitrogen are together the primary component of silicon nitride, accounting for at least 50 wt. %, at least 70 wt. % or at least 90 wt. % of the ceramic material referred to herein as "silicon nitride".

Borophosphosilicate glass (BPSG) is well known to those skilled in the semiconductor art. BPSG is a type of silicate glass that includes additives of both boron and phosphorus. It is typically used as an insulating layer in CMOS.

As used herein, the term "silicon oxide" refers to any oxide of silicon deposited using CVD. Such oxides may also be referred to in the art as "CVD oxide". Some examples of source gases for depositing silicon oxide include: silane and oxygen; dichlorosilane and nitrous oxide; and tetraethylorthosilicate (TEOS).

The Applicant's initial studies found that seemingly robust silicon nitride nozzle structures were corroded upon prolonged exposure to certain dye-based inks. Further studies found that corrosion of a BPSG layer of CMOS and relatively slower corrosion of silicon oxide layers was caused by prolonged exposure to certain dye-based inks.

It was then determined that this corrosion was inhibited by trace metal additives in the ink, such as Al(III) and Fe(III). The corrosion mechanism and the involvement of trace metal additives in inhibiting this corrosion is not fully understood. Initially, the present inventors suspected that impurities in the inks were the culprit. For example, trace amounts of fluoride present in the printhead (either as a residue from etching processes or as a ubiquitous ink contaminant) could potentially catalyze the corrosion of Si—N bonds in silicon nitride. Furthermore, it was plausible that sequestration of fluoride by the trace metal additive would inhibit this corrosion.

However, further experimentation was unable to confirm definitively the presence of fluoride ions being responsible for silicon nitride corrosion. With more detailed studies of BPSG corrosion, a clearer picture emerged of a potential corrosion mechanism. A key finding was that certain dyes appeared to be far more corrosive towards BPSG than other dyes. Specifically, sulfonated dyes having an ammonium, potassium or sodium counterions were found to be much more corrosive than corresponding dyes having a lithium or tetramethylammonium (TMA) counterion. In general, the order of corrosivity appeared to be:

ammonium>K>Na>Li>TMA

In particular, potassium counterions were identified as being particularly problematic, because sulfonated dyes having potassium counterions are present in many commercially-available inkjet dyes and were found to be very corrosive towards silicon nitride and BPSG structures in the Applicant's printheads.

The present inventors have postulated that the order of corrosivity may be related to the solubility of salts generated at the surfaces of corrodible structures. For example, BPSG surfaces liberate small quantities of phosphate and borate anions, which potentially combine with cations from the inkjet dye to form various salts. Relatively insoluble salts, such as lithium phosphate and tetramethylammonium phosphate tend to form a passivating layer, which protects the BPSG surface from further corrosion. On the other hand, relatively soluble salts, such as potassium phosphate will transport the liberated phosphate away from the BPSG surface and accelerate corrosion.

A similar passivating mechanism via insoluble salt formation may also be operating with silicon nitride. This is consistent with the observation that less soluble dye cations (e.g. lithium) tend to be much less corrosive towards silicon nitride than more soluble dye cations (e.g. potassium).

Regardless of the actual mechanism of corrosion, it was found, remarkably, that the addition certain metals, such as Al(III) and Fe(III), to corrosive dye-based inks had a dramatic effect in reducing the rates of corrosion. For the most corrosive inks, a larger quantity of metal additive was required (e.g. 10 to 100 ppm) to inhibit corrosion completely, while for the less corrosive inks a smaller quantity of metal additive was required (e.g. 0.5 to 5 ppm).

A range of metal additives were tested and a correlation emerged between the solubility of phosphate salts and the rate of corrosion. In general, metal ions having relatively insoluble phosphate salts were found to inhibit corrosion of BPSG. Based on these observations, it is understood that the following metal ions (having relatively insoluble phosphates) are suitable for inhibiting corrosion in printheads: Al(III), Fe(III), Fe(II), Cu(II), Cu(I), Bi(III), Cr(III), Mg(II), Sr(II), Ba(II), Ce(III), Ag(I). Likewise, some metals are suitable for inhibiting corrosion in their elemental form e.g. Al, Fe, Ce, Cu, Cr, Mg and Ag. However, trivalent metal additives, such as Al(III) and Fe(III) are generally preferred.

Typically, the metal additive is soluble in the dye-based ink. Some examples of suitable soluble metal additives include: aluminium nitrate nonahydrate; aluminium perchlorate nonahydrate; aluminium chlorate nonahydrate; iron(III) nitrate nonahydrate; iron(III) hydroxide, ammonium iron(III) sulfate, iron(III) sulfate heptahydrate, iron(III) chloride and iron(III) bromide; copper(II) nitrate; magnesium nitrate hexahydrate; bismuth(III) nitrate pentahydrate; and silver nitrate.

In cases where the metal additive is present in the ink in an insoluble particulate form (e.g. alumina particles, aluminium metal particles etc.), the average particle size of the metal additive is typically in the range of 0.01 to 2 microns, 0.05 to 1 microns or 0.1 to 0.5 microns.

Optionally, the ink comprises 0.01 to 25 wt. % of the dye, or optionally 0.1 to 10 wt. %. The balance of the ink is an ink vehicle, the components of which are not particularly limited. Some exemplary ink vehicles are described hereinbelow.

Optionally, the dye comprises is a sulfonated dye comprising one or more sulfonate groups having a counterion. For example, the dye may be a sulfonated azo dye (e.g. Food Black 2, Direct Blue 1), a sulfonated phthalocyanine dye or other sulfonated dye. A more detailed description of suitable inks and dyes is provided hereinbelow.

Optionally, the sulfonated dye comprises at least one of: an ammonium, a potassium or a sodium counterion. Some common inkjet dyes comprising potassium counterions have been shown to be particularly aggressive against corrodible silicon nitride and BPSG structures, when compared to, for example, dyes containing only lithium counterions.

The amount of metal additive required to suppress corrosion will vary depending on how aggressive a particular ink is towards corrodible structures. Optionally, the metal additive is contained in the ink in a concentration in the range of 0.1 to 200 ppm with respect to the metal. Optionally, the concentration of metal additive is in the range of 0.1 to 150 ppm, 0.1 to 100 ppm or 0.5 to 50 ppm. It is surprising that relatively low concentrations of a soluble metal additive (e.g. aluminium nitrate) are efficacious in suppressing relatively high rates of corrosion in silicon nitride and BPSG structures. With an insoluble metal additive (e.g. alumina), a higher concentration of metal additive may be required. For example, a concentration of 0.1 to 1 g/L is typically required for alumina to suppress silicon nitride corrosion.

Optionally, the ink has an alkaline pH. Optionally, the ink has a pH in the range of 7.5 to 9.5, or optionally in the range of 8 to 9. It has been found that metal additives are particularly efficacious when used with relatively alkaline inkjet inks.

Optionally, the printhead is selected from the group consisting of: thermal bubble-forming inkjet printheads; thermal bend-actuated inkjet printheads; and piezoelectric inkjet printheads.

Optionally, each nozzle chamber comprises a roof and sidewalls, wherein at least one of the roof and sidewalls is comprised of silicon nitride.

Optionally, each roof defines part of a nozzle plate for the printhead, wherein the nozzle plate is comprised of silicon nitride.

Optionally, each nozzle chamber comprises a floor and a roof having a plurality of layers, and wherein a lower layer of the roof is comprised of silicon nitride.

Optionally, the roof is bilayered, and wherein an upper layer of the roof is comprised of silicon oxide.

Optionally each nozzle chamber comprises a heater element for heating at least some of the ink to a temperature sufficient to cause formation of a bubble in the nozzle chamber.

Optionally, each nozzle chamber comprises a thermal bend actuator comprising a passive beam and a thermoelastic active beam fused to the passive beam.

Optionally, the passive beam comprises a first layer comprised of silicon nitride and a second layer comprised of silicon dioxide, the second layer being sandwiched between the first layer and the active beam.

Optionally, a roof of each nozzle chamber comprises a moveable paddle, the moveable paddle comprising the thermal bend actuator.

Optionally, the printhead comprises CMOS layers having at least one layer of BPSG exposed to the ink.

Optionally, the printhead comprises CMOS layers having at least one layer of silicon oxide exposed to ink.

Optionally, the printhead comprises a plurality of ink inlets defined by openings through the CMOS layers. The ink inlets may expose edge portions of BPSG and/or silicon oxide layer to ink.

In a second aspect, there is provided a kit comprising:
a printer having an inkjet printhead, the inkjet printhead comprising at least one structure comprised of silicon nitride, borophosphosilicate glass (BPSG) or silicon oxide, the structure having a surface exposed to ink; and
at least one ink cartridge for installation in the printer, the ink cartridge containing an inkjet ink, wherein the ink comprises:
water;
a dye; and
a metal additive for minimizing corrosion of the exposed surface, the metal additive comprising one or more metals selected from the group consisting of: Al(III), Fe(III), Fe(II), Cu(II), Cu(I), Bi(III), Cr(III), Mg(II), Sr(II), Ba(II), Ce(III), Ag(I), Al, Fe, Ce, Cu, Cr, Mg and Ag.

The kit according to third aspect may be in the form of a box or the like containing the printer and a plurality of ink cartridges for installation in the printer by a user.

In a third aspect, there is provided a method of minimizing corrosion of at least one corrodible structure in a microfluidic device, the corrodible structure being comprised of silicon nitride, borophosphosilicate glass (BPSG) or silicon oxide, the method comprising exposing a surface of the structure to a liquid comprising a metal additive, wherein the metal additive comprising one or more metals selected from the group consisting of: Al(III), Fe(III), Fe(II), Cu(II), Cu(I), Bi(III), Cr(III), Mg(II), Sr(II), Ba(II), Ce(III), Ag(I), Al, Fe, Ce, Cu, Cr and Ag.

Microfluidic devices will be well-known to the person skilled in the art. Usually, the microfluidic device is an inkjet printhead, but it will be appreciated that the present invention is equally applicable to other microfluidic devices, such as lab-on-a-chip devices. The present Applicant has described lab-on-a-chip devices fabricated using MEMS technology in, for example, U.S. Pat. No. 7,887,756, the contents of which is herein incorporated by reference.

Optionally, the microfluidic device is an inkjet printhead selected from the group consisting of: thermal bubble-forming inkjet printheads; thermal bend-actuated inkjet printheads; and piezoelectric inkjet printheads.

Optionally, the liquid protects the exposed corrodible surfaces against subsequent corrosion by conventional inkjet inks lacking the metal additive. Hence, the method according to the fourth aspect may be employed as a treatment for a printhead prior to distribution and use. This obviates continuous exposure of the printhead to the metal additive via a treated ink, which may have unforeseen deleterious side-effects over time.

Optionally, the liquid is a test ink supplied to the printhead for initial testing and verification of the printhead following fabrication of the printhead. The test ink is typically removed from the printhead prior to distribution and use.

Optionally, the liquid is a shipping fluid which is used to fill fluidic pathways in the printhead prior to shipment of the printhead. The shipping fluid is typically utilized to minimize degradation of hydrophilically-treated surfaces in the printhead during shipment (e.g. surfaces exposed to an oxygen plasma). However, in accordance with this embodiment, the shipping fluid may function to dope the printhead with the metal additive and inhibit subsequent degradation of corrodible structures in the printhead. The shipping fluid is removed from the printhead prior to use.

Optionally, the liquid is infused with the metal additive by virtue of exposure to a metal surface en route to the corrodible surfaces. The metal surface may be any surface in the fluidic pathway of a printer or other microfluidic device. For example, any one of an ink cartridge, an ink line, a pressure-regulating chamber, an ink manifold or channels/chambers in the printhead itself may comprise the metal surface. Typically, the metal surface is comprised of aluminium.

In a fifth aspect, there is provided an inkjet printer comprising:
an inkjet printhead comprising at least one corrodible structure comprised of silicon nitride, borophosphosilicate glass (BPSG) or silicon oxide, the corrodible structure having a surface exposed to ink; and
a fluidic pathway for delivering ink to nozzle openings in the printhead, wherein part of the fluidic pathway is comprised of aluminium metal such that ink supplied to the nozzle openings is exposed to the aluminium metal.

The printer according to the fifth aspect advantageously enables conventional inkjet inks (i.e. those inks not specifically formulated with a metal additive) to be used in printheads having corrodible structures, whilst still minimizing corrosion of such structures.

Optionally, the aluminium metal is disposed in one or more of:
an ink cartridge in fluid communication with the printhead;
a pressure-regulating chamber in fluid communication with the printhead;
an ink manifold for supplying ink to the printhead;
an ink line for supplying ink to the printhead;
an inline filter;
an inline pump;
ink supply channels defined in the printhead; and
the nozzle chambers of the printhead.

Optionally, a surface area of the aluminium metal to which the ink is exposed is sufficient to infuse the ink with an aluminium additive.

Optionally, the aluminium additive is present in ink downstream of the aluminium metal in an amount ranging from 0.01 to 200 ppm with respect to aluminium.

Optionally, a surface area of the aluminium metal to which the ink is exposed is in the range of 0.5 to 200 cm$^2$. Optionally, the surface area of aluminium is in the range of 10 to 150 cm$^2$.

Optionally, at least part of the aluminium metal is configured as a mesh or a sponge in order to maximize its surface area.

Optionally, the fluidic pathway comprises an ink reservoir for supplying ink to the printhead, wherein the ink reservoir contains a conventional inkjet ink formulated without an metal additive.

In a sixth aspect, there is provided an ink cartridge for an inkjet printer, the ink cartridge having one or more surfaces exposed to an ink contained therein, wherein at least of one of the surfaces is defined by aluminium metal.

The ink cartridge according to the fifth aspect advantageously enables conventional inkjet inks (i.e. those inks not specifically formulated with a metal additive) to be used in printheads having corrodible structures, whilst still minimizing corrosion of such structures.

Typically, the ink contained in the ink cartridge is a dye-based ink as described above in connection with the first aspect.

In a seventh aspect, there is provided an inkjet ink comprising:
water;
0.01 to 25 wt. % of a dye having one or more sulfonate groups, wherein said dye comprises one or more counterions selected from the group consisting of: potassium, sodium and ammonium; and
a metal additive for minimizing corrosion of corrodible surfaces in an inkjet printhead, said metal additive comprising one or more metals having a metal phosphate solubility of less than 1 gram per liter.

Optionally, the metal additive comprises one or more metals having a metal phosphate solubility of less than 0.1, less than 0.01, less than 0.001 or less than $10^{-5}$ grams per liter (e.g. a metal phosphate solubility in the range of $10^{-9}$ to 0.1 grams per liter)

Optionally, the metal additive comprises one or more metals selected from the group consisting of: Al(III), Fe(III), Fe(II), Cu(II), Cu(I), Bi(III), Cr(III), Mg(II), Sr(II), Ba(II), Ce(III), Ag(I), Al, Fe, Ce, Cu, Cr, Mg and Ag.

Optionally, the dye comprises a potassium counterion.
Optionally, the dye has no carboxylate groups.
Optionally, the ink has pH in the range of 6 to 8.
Optionally, the ink further comprises 5 wt % to 40 wt % of a co-solvent. Typical co-solvent systems are described in further detail below.

Optionally, the co-solvent comprises one or more water-soluble organic compounds selected from the group consisting of: N—($C_{1-6}$ alkyl)-2-pyrrolidinone; $C_{1-6}$ alcohol; ethylene glycol; diethylene glycol; and glycerol.

Optionally, the ink further comprises one or more of: a surfactant; a pH adjuster; a biocide; and a sequestering agent. Examples of such ink components are described in further detail below.

In an eighth aspect, there is provided a use of an inkjet ink as described in connection with the seventh aspect for inhibiting corrosion of a corrodible structure in a printhead, the corrodible structure being comprised of silicon nitride, borophosphosilicate glass (BPSG) or silicon oxide.

BRIEF DESCRIPTION OF THE DRAWINGS

Various embodiments of the present invention will now be described by way of example only with reference to the accompanying drawings, in which:—

DETAILED DESCRIPTION OF THE INVENTION

Figure 1:
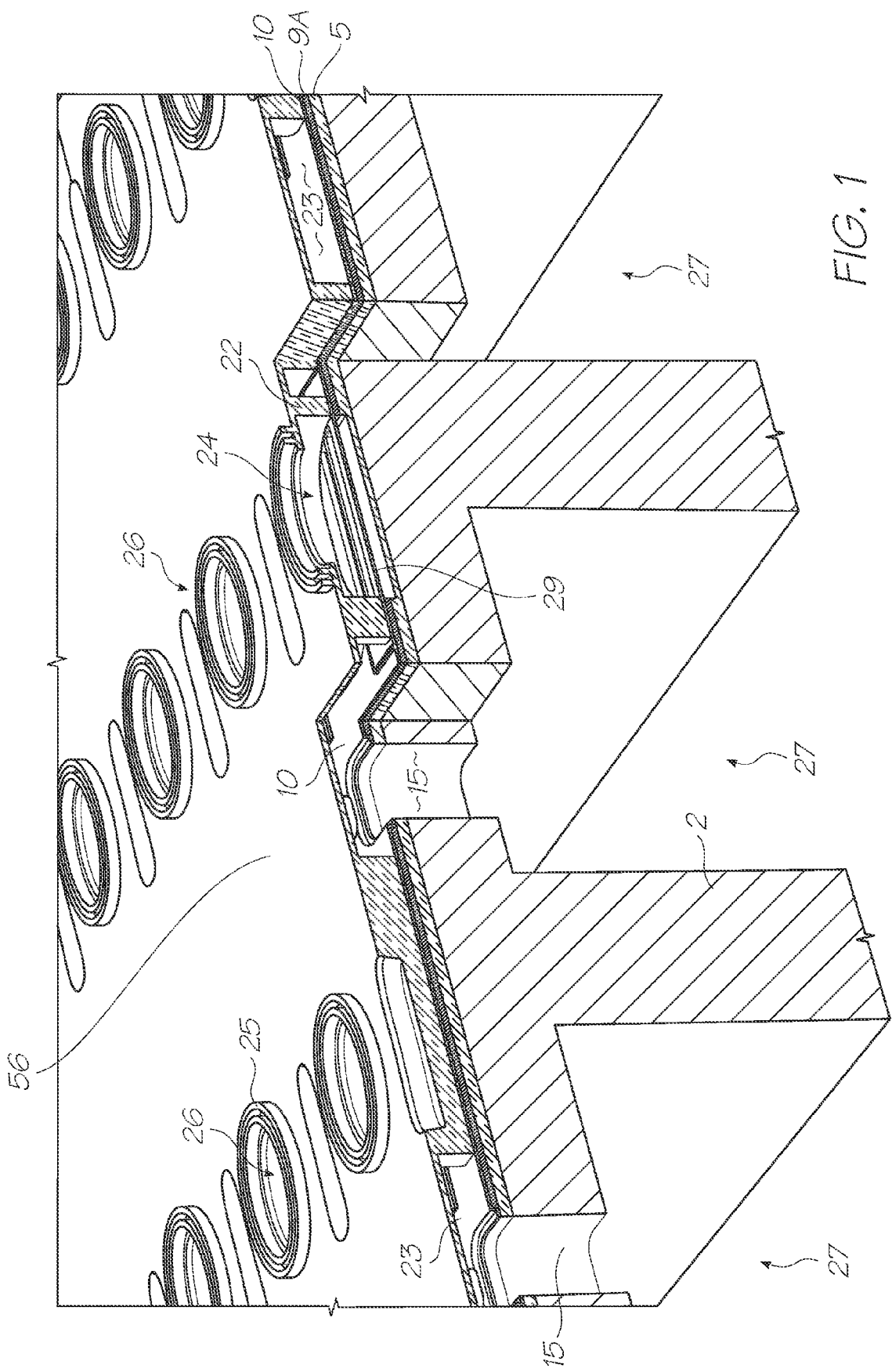
FIG. 1 is a perspective view of part of a thermal bubble-forming inkjet printhead having a silicon nitride nozzle plate and chamber sidewalls.

As foreshadowed above, the present invention minimizes corrosion of corrodible structures in inkjet printheads which are exposed to certain dye-based inks. The corrodible structures are typically silicon nitride, BPSG and, to a lesser extent, silicon oxide.

Silicon Nitride Corrosion

Initially, the present Applicant observed print defects in certain color channels of its inkjet printheads, most noticeably in black color channels. Forensic examination of such printheads using SEM microscopy revealed that a degree of roof delamination was occurring and it was posited that the dye-based ink was responsible for corroding silicon nitride structures in the nozzle chamber. Significantly, in printheads having a bilayered roof (an upper layer of silicon oxide and a lower layer of silicon nitride), the corrosion was most evident in the silicon nitride layer. Silicon surfaces in the printhead were observed to be resistant to corrosion by the dye-based inks.

Following these observations, the Applicant conducted a comprehensive series of experiments in order to elucidate more fully the nature of the corrosion and to find possible solutions to this problem.

To this end, silicon nitride coupons were fabricated having a layer of silicon nitride deposited onto a blanket silicon substrate. The thickness of silicon nitride was accurately measured before and after soaks tests in various ink formulations using a UV interferometer. In this way, the corrosiveness of a range ink formulations towards silicon nitride could be determined.

It was found that the rate of corrosion was strongly dependent on the particular ink formulation. Those inks containing potassium salts of sulfonate groups (e.g. Food Black 2) were found to be highly corrosive. Corresponding sodium salts were still corrosive but to a lesser extent than potassium salts. These observations were broadly consistent with SEM observations on actual printheads.

Initial experiments showed that aluminium additives in the ink (e.g. aluminium nitrate nonahydrate, alumina, elemental aluminium etc.) were remarkably effective in suppressing silicon nitride corrosion in otherwise highly corrosive inks. In many cases, even at very low concentrations (e.g. 10 ppm), the aluminium additive was highly effective in suppressing corrosion of silicon nitride Therefore, it was concluded that treatment of dye-based inks with a small concentration of an aluminium additive (e.g. aluminium nitrate nonahydrate) was an effective method of minimizing the roof delamination observed in the Applicant's printheads.

Iron additives in the form of soluble iron(III) salts were also shown to reduce the rates of silicon nitride corrosion, although aluminium additives were generally more effective in most inks. Combinations of aluminium and iron additives were, likewise, effective in suppressing silicon nitride corrosion.

It was further observed that the corrosive effects of 'untreated' inks could be suppressed merely by exposing these inks to an aluminium metal surface. Presumably, a trace amount of an aluminium additive is infused into the ink by the aluminium surface, which is sufficient to suppress corrosion of silicon nitride. These observations have important implications for the design of inkjet printers. If an aluminium metal surface is incorporated into the ink pathway upstream of the printhead, then untreated inks may be used in the Applicant's printers without corroding silicon nitride structures therein. It will be appreciated that an aluminium surface may be readily incorporated anywhere into the ink pathway, for example, in ink cartridges, ink lines, filters, pressure-regulating chambers or even the printhead itself.

BPSG Corrosion

With the silicon nitride corrosion results in hand, the Applicant then investigated another known failure mechanism in its inkjet printheads—that is, corrosion of a BPSG layer in the CMOS layers. During the course of printhead testing, it had become evident from SEM microscopy that an exposed edge region of a BPSG layer was corroded and led to electrical failure once ink was allowed to reach CMOS metal layer(s).

Accordingly, BPSG test coupons were fabricated by analogy with the silicon nitride coupons described above. A layer of BPSG was deposited onto a blanket silicon substrate and the thickness of BPSG layer was accurately measured before and after soaks tests in various ink formulations using a UV interferometer. In this way, the corrosiveness of a range ink formulations towards BPSG could be determined.

Once again, it was found that the rate of corrosion of BPSG was strongly dependent on the particular ink formulation. Those inks containing potassium salts of sulfonate groups were found to be highly corrosive. On the other hand, inks having a metal counterion which formed relatively insoluble phosphates (e.g. lithium) were found to be much less corrosive. In virtually all cases, the addition of an aluminium and/or iron additive (in the form of a soluble Al(III) or Fe(III) salt) was effective in suppressing the BPSG corrosion.

Other metal additives, such as copper, bismuth, magnesium and silver salts were also shown to reduce the rate of BPSG corrosion. Typically, in order to suppress a rate of BPSG corrosion the metal additive comprises one or more metals wherein the metal has a corresponding metal phosphate solubility of less than 1 gram per liter. The most effective metals for suppressing BPSG corrosion rates had a corresponding metal phosphate solubility of less than $10^{-5}$ grams per liter.

Silicon Oxide Corrosion

The Applicant's studies have shown that silicon oxide appears to corrode at a relatively slower rate than either silicon nitride or BPSG. Nevertheless, silicon oxide structures are still somewhat corrodible upon prolonged exposure to certain dye-based inks and it has been found, through suitable silicon oxide coupon testing, that this relatively slow corrosion can also be suppressed using the metal additives describe above.

A detailed description of the Applicant's experiments demonstrating the effects of the present invention are presented in the Experimental Section hereinbelow.

Inkjet Printheads Comprising Exposed Corrodible Structures

The inkjet inks described herein minimize corrosion of exposed corrodible structures in inkjet printheads. There now follows a brief description of some examples of inkjet printheads, which incorporate such corrodible structures.

Thermal Bubble-Forming Inkjet Printheads

Figure 2:
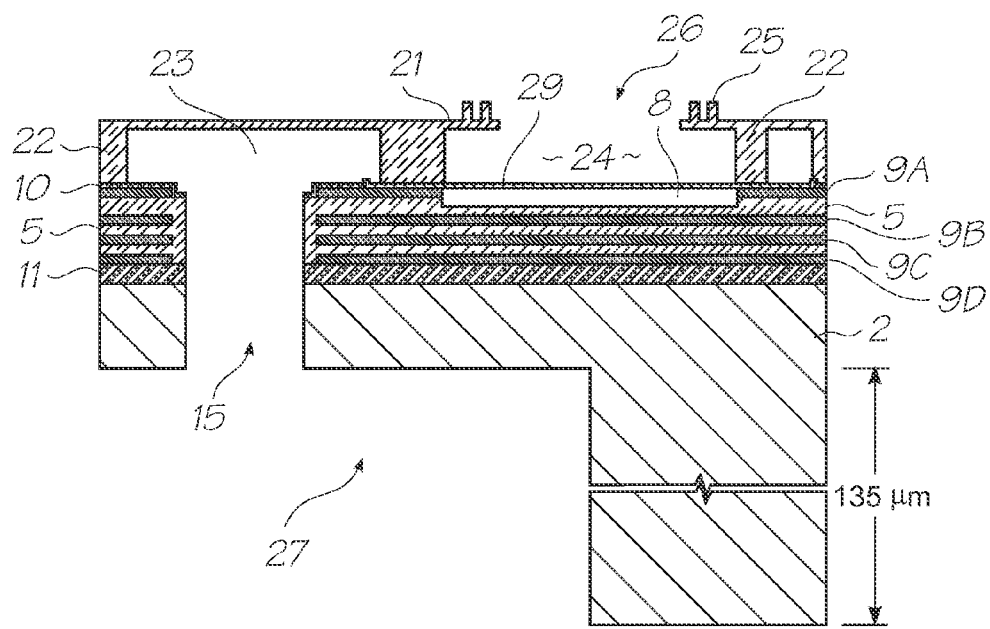
FIG. 2 is a side view of one of the nozzle assemblies shown in FIG. 1, including CMOS layers.
Figure 3:
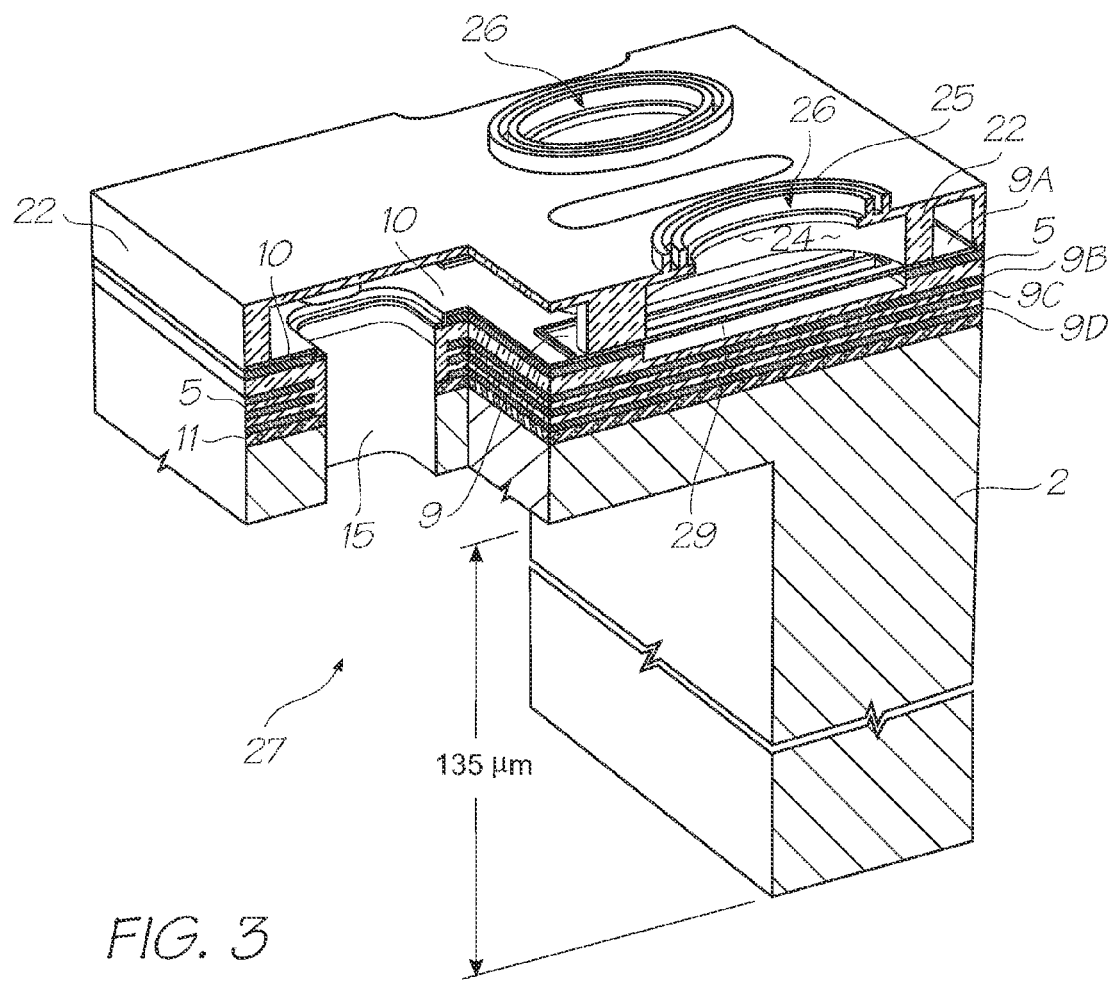
FIG. 3 is a perspective of the nozzle assembly shown in FIG. 2.

Referring to FIG. 1, there is shown part of printhead comprising a plurality of nozzle assemblies as described in U.S. Pat. No. 7,303,930, the contents of which is herein incorporated by reference. FIGS. 2 and 3 show one of these nozzle assemblies in side-section and cutaway perspective views.

Each nozzle assembly comprises a nozzle chamber 24 formed by MEMS fabrication techniques on a silicon wafer substrate 2. The nozzle chamber 24 is defined by a roof 21 and sidewalls 22 which extend from the roof 21 towards the silicon substrate 2. As shown in FIG. 1, each roof is defined by part of a nozzle plate 56, which spans across an ejection face of the printhead. The nozzle plate 56 and sidewalls 22 are formed of the same material, which is deposited by PECVD over a sacrificial scaffold of photoresist during MEMS fabrication. The nozzle plate 56 and sidewalls 21 are formed only of silicon nitride in the printhead shown in FIGS. 1 to 3. Silicon nitride is chosen, because it is readily deposited by PECVD and has the characteristics of hardness, robustness and resistance to cracking. Moreover, the inherently relative hydrophilic nature of silicon nitride is advantageous for supplying ink to the nozzle chambers 24 by capillary action. However, SEM microscopy has revealed corrosion of these silicon nitride structures in some color channels of used printheads.

Returning to the details of the nozzle chamber 24, it will be seen that a nozzle opening 26 is defined in a roof of each nozzle chamber 24. Each nozzle opening 26 is generally elliptical and has an associated nozzle rim 25. The nozzle rim 25 assists with drop directionality during printing as well as reducing, at least to some extent, ink flooding from the nozzle opening 26. The actuator for ejecting ink from the nozzle chamber 24 is a heater element 29 positioned beneath the nozzle opening 26 and suspended across a pit 8. Current is supplied to the heater element 29 via electrodes defined by an exposed region of a Metal 4 CMOS layer 9A. In these regions, the Metal 4 CMOS layer 9A is exposed through a passivation layer 10 covering the underlying CMOS layers. The pit 8 is defined in a CVD oxide layer 5 positioned beneath the uppermost Metal 4 CMOS layer 9A.

When a current is passed through the heater element 29, it rapidly superheats surrounding ink to form a gas bubble, which forces ink through the nozzle opening 26. By suspending the heater element 29, it is completely immersed in ink when the nozzle chamber 24 is primed. This improves printhead efficiency, because less heat dissipates into the underlying substrate 2 and more input energy is used to generate a bubble.

As seen most clearly in FIG. 1, the nozzles are arranged in rows and an ink supply channel 27, which extends longitudinally along the row, supplies ink to each nozzle in the row. The ink supply channel 27 delivers ink to an ink inlet passage 15, which, in turn, supplies ink to an ink conduit 23 extending parallel with the nozzle rows. The ink conduit 23 supplies ink into a side of each nozzle chamber 24.

Returning to FIGS. 2 and 3, the ink inlet passage 15 is defined by an opening through the CMOS layers and an upper portion of the silicon substrate 2. The CMOS layers are comprised of a lower BPSG layer 11 and four metal layers 9A, 9B, 9C, 9D which are separated from each other by dielectric CVD oxide layers 5. It will be noted that the BPSG layer 11 and the CVD oxide layers 5 have edge portions defining sidewalls of the ink inlet passage 15. Hence, these layers define potentially corrodible structures which are exposed to ink flowing through the ink inlet passage 15. SEM microscopy of used printheads has revealed notches in the BPSG layer 11 as a result of corrosion; these notches can eventually grow to expose the Metal 1 CMOS layer 9D, resulting in printhead failure.

The MEMS fabrication process for manufacturing such printheads was described in detail in U.S. Pat. No. 7,303,930, the contents of which are herein incorporated by reference.

The operation of printheads having suspended heater elements is described in detail in the Applicant's U.S. Pat. No. 7,278,717, the contents of which are incorporated herein by reference.

The Applicant has also described thermal bubble-forming inkjet printheads having embedded heater elements. Such printheads are described in, for example, U.S. Pat. No. 7,246,876 and US 2006/0250453, the contents of which are herein incorporated by reference. It will be appreciated that the advantages of the present invention are realized irrespective of whether the heater element is suspended or embedded in the nozzle chamber.

Figure 4:
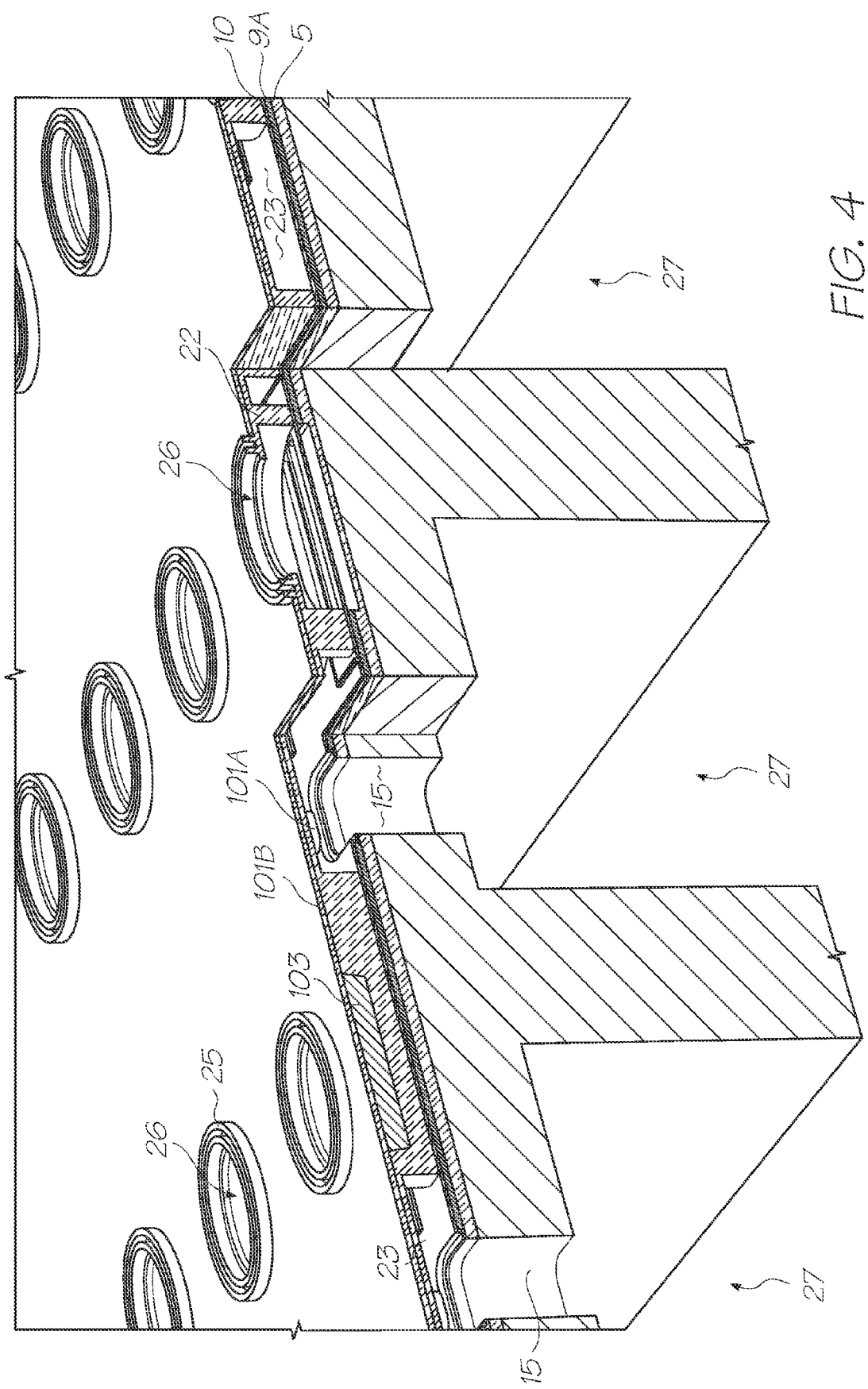
FIG. 4 is a perspective view of part of a thermal bubble-forming inkjet printhead having a bi-layered nozzle plate.

Referring to FIG. 4, there is shown a printhead having a bilayered nozzle plate. A lower layer 101A of the nozzle plate is comprised of silicon nitride and an upper layer 101B of the nozzle plate is comprised of silicon oxide. All other features of the printhead shown in FIG. 4 are the same as the printhead shown in FIG. 1, and it will be appreciated that all like structures have been given the same reference numerals in FIGS. 1 to 4.

The fabrication and advantages of printheads having a bilayered nozzle plate are described in U.S. Pat. No. 7,658,977, the contents of which are herein incorporated by reference. However, when the printhead shown in FIG. 4 is exposed to certain dye-based inks, a degree of roof delamination is observed due to corrosion of the silicon nitride layer 101A in the uppermost corners of each nozzle chamber.

Thermal Bend-Actuated Inkjet Printheads

Figure 5:
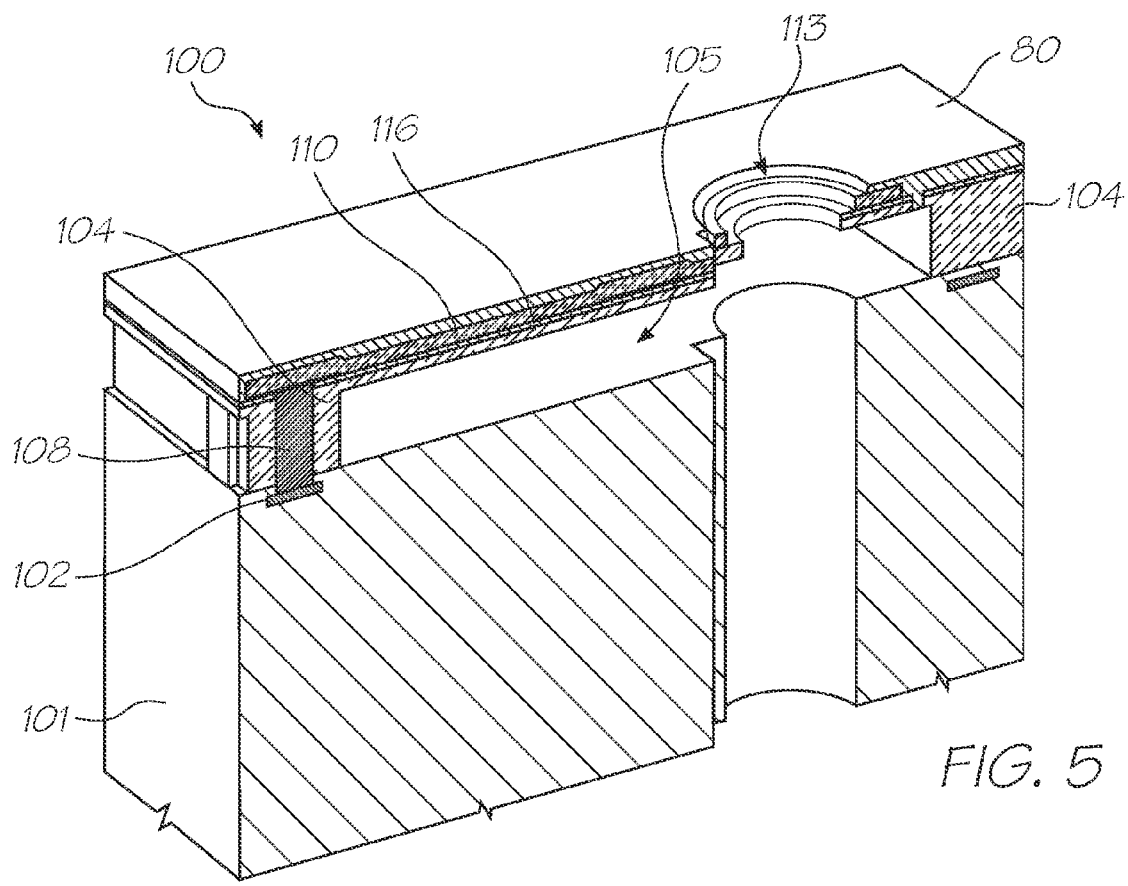
FIG. 5 is a perspective view of a nozzle assembly having a thermal bend actuator with a bi-layered passive beam.

Referring to FIG. 5, there is shown a nozzle assembly 100 for a thermal bend-actuated printhead, as described in US 2011/0050806, the contents of which is incorporated herein by reference.

The nozzle assembly 100 is comprised of a substrate 101 having electrodes 102 formed in an upper portion thereof (For clarity, the CMOS layers and passivation layer are not shown in FIG. 5). The electrode 102 shown in FIG. 5 is one of a pair of adjacent electrodes (positive and earth) for supplying power to a thermoelastic active beam 110 disposed on a roof of the nozzle chamber 105 via connector posts 108. The connector posts 108 extend linearly between the electrodes 102 and the active beam 110, and the electrodes receive power from CMOS drive circuitry (not shown) in upper layers of the substrate 101.

The connector posts 108 are encased in sidewalls 104 of the nozzle chamber 105. The sidewalls may be comprised of silicon oxide or silicon nitride. As shown in FIG. 5, the sidewalls are comprised of silicon nitride.

Figure 6:
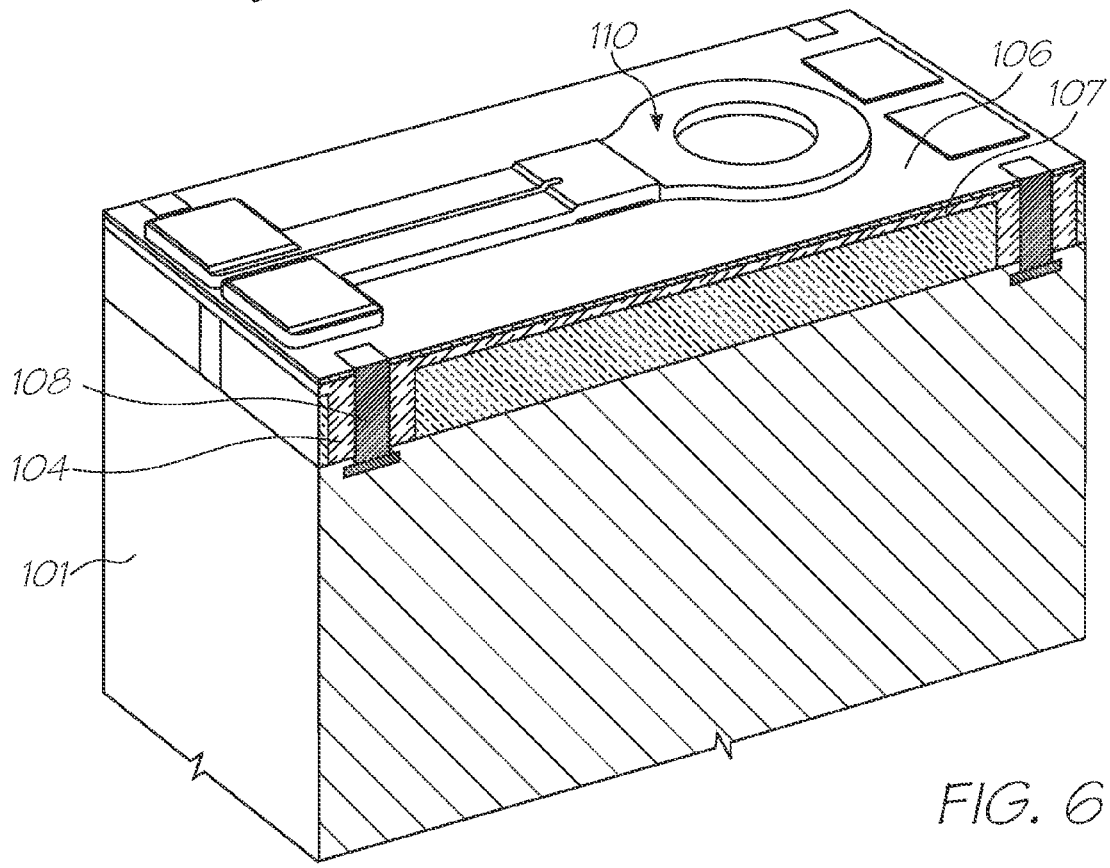
FIG. 6 is a perspective view a partially-fabricated nozzle assembly shown in FIG. 5 showing the active thermoelastic beam.

A bilayered roof of the nozzle chamber 105 is comprised of a lower layer of silicon nitride 107 and an upper layer of silicon oxide 106. Part of the roof defines a passive beam 116 for the thermoelastic beam 110 disposed on the roof (see FIG. 6).

The thermoelastic beam 110 and bilayered passive beam 116 together define a thermal bend actuator. Upon actuation, the thermoelastic beam 110 expands relative to the passive beam 116 causing a moveable part of the roof to bend towards the substrate 110 resulting in ejection of ink from the nozzle opening 113.

Silicon nitride is employed in the passive beam 116, because it is less susceptible to cracking than silicon oxide and allows a greater range of residual stresses—both compressive and tensile stresses. Furthermore, silicon nitride is completely impermeable, which minimizes nozzle failure via leaching of ions from ink in the nozzle chamber to the active beam 110. Since silicon nitride has a much higher thermal conductivity than silicon oxide, the passive beam 116 employs an insulating layer of silicon oxide between the silicon nitride and the thermoelastic active beam 110. However, it will be appreciated that the exposed silicon nitride layer in the passive beam 116 is potentially corrodible by certain dye-based inks as described herein.

The thermoelastic active beam member 110 may be comprised of any suitable thermoelastic material, such as titanium nitride, titanium aluminium nitride or aluminium alloys. As explained in the Applicant's earlier US Publication No. 2008/0129793 (the contents of which are herein incorporated by reference), vanadium-aluminium alloys are a preferred material, because they combine the advantageous properties of high thermal expansion, low density and high Young's modulus.

Still referring to FIG. 5, a polymer coating 80 covers the roof of the nozzle assembly 100. The polymer coating 80 extends over the entire nozzle plate of the printhead and provides a hydrophobic ink ejection surface. The polymer layer 80 also fills a perimeter region around a moveable part of the roof to provide a mechanical seal for the moveable part of the roof. The polymer has a sufficiently low Young's modulus to allow the actuator to bend towards the substrate 101 during actuation.

The polymer coating 80 is typically comprised of a polymerized siloxane, which may be deposited in a thin layer (e.g. 0.5 to 2.0 microns) using a spin-on process. Examples of suitable polymeric materials are poly(alkylsilsesquioxanes), such as poly(methylsilsesquioxane); poly(arylsilsesquioxanes), such as poly(phenylsilsesquioxane); and poly(dialkylsiloxanes), such as a polydimethylsiloxane. It will be appreciated that the printheads described in connection with FIGS. 1 to 4 may comprise a polymer coating 80 to provide a desirably hydrophobic ink ejection surface.

Other Microfluidic Devices Comprising Exposed Silicon Nitride Structures

Although the present invention has been developed for use in some of the Applicant's MEMS inkjet printheads, as described above, it will be appreciated that the invention is not so limited in scope.

Piezoelectric printheads may include corrodible structures (e.g. silicon nitride, BPSG) and the present invention is equally applicable to such printheads. An example of a piezo printhead incorporating an exposed silicon nitride surface is described in U.S. Pat. No. 4,992,808, assigned to Xaar Limited.

Other microfluidic devices, such as lab-on-a-chip devices useful for the analysis of biological fluids, may also include silicon nitride or BPSG structures. It will be appreciated that such devices will also benefit from the methods of minimizing corrosion described herein. By way of example, the Applicant's microfluidic devices described in U.S. Pat. No. 7,887,756, the contents of which are herein incorporated by reference, may comprise exposed silicon nitride surfaces.

Inks

The inks employed in connection with the present invention typically comprise 0.01-25 wt. % of a dye, a metal additive and an ink vehicle as the balance. The amount of metal additive may vary depending on the type of additive present. For example, soluble trivalent aluminium may be present in an amount ranging from 0.01 to 200 ppm. On the other hand, insoluble metal additives (e.g. alumina particles, elemental aluminium particles etc) may be present in the ink in larger amounts as described herein.

Inkjet dyes will be well-known to the person skilled in the art and the present invention is not limited to any particular type of dye. By way of example, dyes suitable for use in the present invention include azo dyes (e.g. Food Black 2), metal complex dyes, naphthol dyes, anthraquinone dyes, indigo dyes, carbonium dyes, quinone-imine dyes, xanthene dyes, cyanine dyes, quinoline dyes, nitro dyes, nitroso dyes, benzoquinone dyes, naphthoquinone dyes, phthalocyanine dyes (including naphthalocyanine dyes), and metal phthalocyanine dyes (including metal naphthalocyanine dyes, such as those described in U.S. Pat. No. 7,148,345, the contents of which is herein incorporated by reference).

Examples of suitable dyes include: CI Direct Black 4, 9, 11, 17, 19, 22, 32, 80, 151, 154, 168, 171, 194 and 195; CI Direct Blue 1, 2, 6, 8, 22, 34, 70, 71, 76, 78, 86, 142, 199, 200, 201, 202, 203, 207, 218, 236 and 287; CI Direct Red 1, 2, 4, 8, 9, 11, 13, 15, 20, 28, 31, 33, 37, 39, 51, 59, 62, 63, 73, 75, 80, 81, 83, 87, 90, 94, 95, 99, 101, 110, 189, 225 and 227; CI Direct Yellow 1, 2, 4, 8, 11, 12, 26, 27, 28, 33, 34, 41, 44, 48, 86, 87, 88, 132, 135, 142 and 144; CI Food Black 1 and 2; CI Acid Black 1, 2, 7, 16, 24, 26, 28, 31, 48, 52, 63, 107, 112, 118, 119, 121, 172, 194 and 208; CI Acid Red 4, 14, 18, 23, 27, 73, 87, 88, 114, 131, 138, 151; CI Acid Blue 1, 7, 9, 15, 22, 23, 27, 29, 40, 43, 55, 59, 62, 78, 80, 81, 90, 102, 104, 111, 185 and 254; CI Acid Yellow 1, 3, 4, 7, 11, 12, 13, 14, 19, 23, 25, 34, 38, 41, 42, 44, 53, 55, 61, 71, 76 and 79; CI Reactive Blue 1, 2, 3, 4, 5, 6, 7, 8, 9, 13, 14, 15, 17, 18, 19, 20, 21, 25, 26, 27, 28, 29, 31, 32, 33, 34, 37, 38, 39, 40, 41, 43, 44 and 46; CI Reactive Red 1, 2, 3, 4, 5, 6, 7, 8, 11, 12, 13, 15, 16, 17, 19, 20, 21, 22, 23, 24, 28, 29, 31, 32, 33, 34, 35, 36, 37, 38, 39, 40, 41, 42, 43, 44, 45, 46, 49, 50, 58, 59, 63, 64, and 180; CI Reactive Yellow 1, 2, 3, 4, 6 7, 11, 12, 13, 14, 15, 16, 17, 18, 22, 23, 24, 25, 26, 27, 37 and 42; CI Reactive Black 1, 3, 4, 5, 6, 8, 9, 10, 12, 13, 14 and 18; Pro-Jet® dyes available from Fuji Film Imaging Colorants, Inc. (e.g. Pro-Jet® Cyan 1; Pro-Jet® Cyan GLF; Pro-Jet® Fast Cyan 2; Pro-Jet® Fast Black 1; Pro-Jet® Fast Black 2; Pro-Jet® Black 168; Pro-Jet® Magenta 1; Pro-Jet® Magenta 432; Pro-Jet® Fast Magenta 2; Pro-Jet® Violet 631; Pro-Jet® Yellow 1; Pro-Jet® Fast Yellow 2; Pro-Jet® Yellow 1G; Pro-Jet® Yellow 746; and Pro-Jet® Yellow 492).

The present invention is particularly efficacious when used in connection with sodium or potassium salts of sulfonated dyes (e.g. Food Black 2). Such dyes, and potassium salts in particular, have been shown to be very aggressive towards exposed corrodible structures in the printhead, such as silicon nitride nozzle roofs and the BPSG layer in CMOS.

Ink vehicles for inkjet inks will be well known to the person skilled in the art and the ink vehicles used in the present invention are not particularly limited. The present Applicant has recently described non-aqueous inkjet inks for thermal inkjet printheads (see U.S. application Ser. No. 12/577,517 filed on Sep. 11, 2009, the contents of which are herein incorporated by reference), and such non-aqueous inks are also within the ambit of some aspects of the present invention. Non-aqueous ink vehicles for use in thermal inkjets typically comprise a N—($C_{1-6}$ alkyl)-2-pyrrolidinone (e.g. N-methyl-2-pyrrolidinone) and a $C_{1-6}$ alcohol (e.g. ethanol).

However, the ink vehicles used in the present invention are typically conventional aqueous ink vehicles comprising at least 40 wt % water, at least 50 wt % water or at least 60 wt % water. Usually, the amount of water present in the inkjet ink is in the range of 50 wt % to 90 wt %, or optionally in the range of 60 wt % to 80 wt %.

Aqueous inkjet inks compositions are well known in the literature and, in addition to water, may comprise other components, such as co-solvents (including humectants, penetrants, wetting agents etc.), surfactants, biocides, sequestering agents, pH adjusters, viscosity modifiers, etc.

Co-solvents are typically water-soluble organic solvents. Suitable water-soluble organic solvents include $C_{1-4}$ alkyl alcohols, such as ethanol, methanol, butanol, propanol, and 2-propanol; glycol ethers, such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-isopropyl ether, diethylene glycol mono-isopropyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-isopropyl ether, dipropylene glycol monomethyl ether, dipropylene glycol monoethyl ether, dipropylene glycol mono-n-propyl ether, dipropylene glycol mono-isopropyl ether, propylene glycol mono-n-butyl ether, and dipropylene glycol mono-n-butyl ether; formamide, acetamide, dimethyl sulfoxide, sorbitol, sorbitan, glycerol monoacetate, glycerol diacetate, glycerol triacetate, and sulfolane; or combinations thereof.

Other useful water-soluble organic solvents, which may be used as co-solvents, include polar solvents, such as 2-pyrrolidone, N-methylpyrrolidone, ε-caprolactam, dimethyl sulfoxide, sulfolane, morpholine, N-ethylmorpholine, 1,3-dimethyl-2-imidazolidinone and combinations thereof.

The inkjet ink may contain a high-boiling water-soluble organic solvent as a co-solvent, which can serve as a wetting agent or humectant for imparting water retentivity and wetting properties to the ink composition. Such a high-boiling water-soluble organic solvent includes one having a boiling point of 180° C. or higher. Examples of the water-soluble organic solvent having a boiling point of 180° C. or higher are ethylene glycol, propylene glycol, diethylene glycol, pentamethylene glycol, trimethylene glycol, 2-butene-1,4-diol, 2-ethyl-1,3-hexanediol, 2-methyl-2,4-pentanediol, tripropylene glycol monomethyl ether, dipropylene glycol monoethyl glycol, dipropylene glycol monoethyl ether, dipropylene glycol monomethyl ether, dipropylene glycol, triethylene glycol monomethyl ether, tetraethylene glycol, triethylene glycol, diethylene glycol monobutyl ether, diethylene glycol monoethyl ether, diethylene glycol monomethyl ether, tripropylene glycol, polyethylene glycols having molecular weights of 2000 or lower, 1,3-propylene glycol, isopropylene glycol, isobutylene glycol, 1,4-butanediol, 1,3-butanediol, 1,5-pentanediol, 1,6-hexanediol, glycerol, erythritol, pentaerythritol and combinations thereof.

Other suitable wetting agents or humectants include saccharides (including monosaccharides, oligosaccharides and polysaccharides) and derivatives thereof (e.g. maltitol, sorbitol, xylitol, hyaluronic salts, aldonic acids, uronic acids etc.)

The inkjet ink may also contain a penetrant, as one of the co-solvents, for accelerating penetration of the aqueous ink into the recording medium. Suitable penetrants include polyhydric alcohol alkyl ethers (glycol ethers) and/or 1,2-alkyldiols. Examples of suitable polyhydric alcohol alkyl ethers are ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, ethylene glycol mono-n-propyl ether, ethylene glycol mono-isopropyl ether, diethylene glycol mono-isopropyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-isopropyl ether, dipropylene glycol monomethyl ether, dipropylene glycol monoethyl ether, dipropylene glycol mono-n-propyl ether, dipropylene glycol mono-isopropyl ether, propylene glycol mono-n-butyl ether, and dipropylene glycol mono-n-butyl ether. Examples of suitable 1,2-alkyldiols are 1,2-pentanediol and 1,2-hexanediol. The penetrant may also be selected from straight-chain hydrocarbon diols, such as 1,3-propanediol, 1,4-butanediol, 1,5-pentanediol, 1,6-hexanediol, 1,7-heptanediol, and 1,8-octanediol. Glycerol may also be used as a penetrant.

Typically, the amount of co-solvent present in the ink is in the range of about 5 wt % to 40 wt %, or optionally 10 wt % to 30 wt %. A specific example of a co-solvent system, which may be used in the present invention, comprises ethylene glycol, 2-pyrrolidone and glycerol.

The inkjet ink may also contain one or more surface active agents ("surfactant"), such as an anionic surface active agent, a zwitterionic surface active agent, a nonionic surface active agent or mixtures thereof. Useful anionic surface active agents include sulfonic acid types, such as alkanesulfonic acid salts, α-olefinsulfonic acid salts, alkylbenzenesulfonic acid salts, alkylnaphthalenesulfonic acids, acylmethyltaurines, and dialkylsulfosuccinic acids; alkylsulfuric ester salts, sulfated oils, sulfated olefins, polyoxyethylene alkyl ether sulfuric ester salts; carboxylic acid types, e.g., fatty acid salts and alkylsarcosine salts; and phosphoric acid ester types, such as alkylphosphoric ester salts, polyoxyethylene alkyl ether phosphoric ester salts, and glycerophosphoric ester salts. Specific examples of the anionic surface active agents are sodium dodecylbenzenesulfonate, sodium laurate, and a polyoxyethylene alkyl ether sulfate ammonium salt.

Examples of zwitterionic surface active agents include N,N-dimethyl-N-octyl amine oxide, N,N-dimethyl-N-dodecyl amine oxide, N,N-dimethyl-N-tetradecyl amine oxide, N,N-dimethyl-N-hexadecyl amine oxide, N,N-dimethyl-N-octadecyl amine oxide and N,N-dimethyl-N-(Z-9-octadecenyl)-N-amine oxide.

Examples of nonionic surface active agents include ethylene oxide adduct types, such as polyoxyethylene alkyl ethers, polyoxyethylene alkylphenyl ethers, polyoxyethylene alkyl esters, and polyoxyethylene alkylamides; polyol ester types, such as glycerol alkyl esters, sorbitan alkyl esters, and sugar alkyl esters; polyether types, such as polyhydric alcohol alkyl ethers; and alkanolamide types, such as alkanolamine fatty acid amides. Specific examples of nonionic surface active agents are ethers such as polyoxyethylene nonylphenyl ether, polyoxyethylene octylphenyl ether, polyoxyethylene dodecylphenyl ether, polyoxyethylene alkylallyl ether, polyoxyethylene oleyl ether, polyoxyethylene lauryl ether, and polyoxyalkylene alkyl ethers (e.g. polyoxyethylene alkyl ethers); and esters, such as polyoxyethylene oleate, polyoxyethylene oleate ester, polyoxyethylene distearate, sorbitan laurate, sorbitan monostearate, sorbitan mono-oleate, sorbitan sesquioleate, polyoxyethylene mono-oleate, and polyoxyethylene stearate. Acetylene glycol surface active agents, such as 2,4,7,9-tetramethyl-5-decyne-4,7-diol; ethoxylated 2,4,7,9-tetramethyl-5-decyne-4,7-diol; 3,6-dimethyl-4-octyne-3,6-diol or 3,5-dimethyl-1-hexyn-3-ol, may also be used. Specific examples of nonionic surfactants, which may be used in the present invention, are Surfynol® 465 and Surfynol® 440 (available from Air Products and Chemicals, Inc)

The surfactant(s) are typically present in the aqueous inkjet ink in an amount ranging from 0.1 wt % to 10 wt %, or optionally in the range of 0.2 wt % to 5 wt %.

The aqueous inkjet ink may also include a pH adjuster or buffer, such as sodium hydroxide, potassium hydroxide, lithium hydroxide, sodium carbonate, sodium hydrogencarbonate, potassium carbonate, potassium hydrogencarbonate, lithium carbonate, sodium phosphate, potassium phosphate, lithium phosphate, potassium dihydrogenphosphate, dipotassium hydrogenphosphate, sodium oxalate, potassium oxalate, lithium oxalate, sodium borate, sodium tetraborate, potassium hydrogenphthalate, and potassium hydrogentartrate; ammonia; and amines, such as methylamine, ethylamine, diethylamine, trimethylamine, triethylamine, tris(hydroxymethyl)aminomethane hydrochloride, triethanolamine, diethanolamine, diethylethanolamine, triisopropanolamine, butyldiethanolamine, morpholine, propanolamine, 4-morpholineethanesulfonic acid and 4-morpholinepropanesulfonic acid. The pH adjuster or buffer may be present in the aqueous inkjet ink in an amount ranging from 0.01 to 5 wt. %, or optionally 0.05 to 1 wt. %.

The aqueous inkjet ink may also include a biocide, such as benzoic acid, dichlorophene, hexachlorophene, sorbic acid, hydroxybenzoic esters, sodium dehydroacetate, 1,2-benthiazolin-3-one ("Proxel® GXL", available from Arch Chemicals, Inc.), 3,4-isothiazolin-3-one or 4,4-dimethyloxazolidine. The biocide may be present in the aqueous inkjet ink in an amount ranging from 0.01 to 5 wt. %, or optionally 0.05 to 1 wt. %.

The aqueous inkjet ink may also contain a sequestering agent, such as ethylenediaminetetraacetic acid (EDTA). The sequestering agent may be present in the aqueous inkjet ink in an amount ranging from 0.01 to 5 wt. %, or optionally 0.05 to 1 wt. %.

Experimental Section

The following experiments demonstrate the corrosiveness of certain dye-based inks with respect to silicon nitride, BPSG and silicon oxide. The experiments further demonstrate the advantageous effects of metal additives in suppressing this corrosion.

1. Silicon Nitride Corrosion

Methodology

Silicon nitride of the exact composition, formulation and thickness of a typical printhead roof structure was deposited onto blanket silicon wafers without an oxide overcoat. The wafer was diced into 10 mm×10 mm coupons and each was rinsed with DI water and ethanol then dried with compressed air. The thickness of the nitride layer was measured precisely three times at the centre of each coupon using a Nanometrics 210 UV interferometer Film thickness System. A refractive index of 2.00 was used for all measurements and typically a consistent value of within +/−10 Angstroms was recorded. Coupons were placed with the nitride layer uppermost in a soak vessel into which was carefully added 20 g of test fluid. The soak vessels were made of plastic (polystyrene sample jars), because initial experiments using soda glass jars and scintiallation vials gave appreciable background corrosion rates, even with deionized water. Ensuring the tile remained face up, the vessel was sealed and placed in an oven at 70° C. After a period of time, typically ~100 hrs, the vessels were removed from the oven and cooled to room temperature. The coupons were retrieved, rinsed with DI water and ethanol then dried with compressed air. The thickness of the nitride layer at the centre of the coupon was again measured precisely three times using the same interferometer. Differences in film thicknesses were calculated and a corrosion rate, expressed in Angstroms per hour, was obtained by dividing the average thickness of the film lost by the duration of the soak test in hours. The corrosion rate for three coupons was measured for each fluid of interest.

For tests requiring aluminium, squares of 0.3 mm thick aluminium foil measuring 10 mm×10 mm were placed in the vessel close to the coupon.

1.1 Colored Ink Silicon Nitride Corrosion Rates

Initially, a range of colored ink formulations were tested for their silicon nitride corrosion rates. The inks had the following formulations:

TABLE A

Black Ink 1

| Components | Batch wt % |
|---|---|
| Diethylene Glycol | 12 |
| 2-Pyrrolidone | 8 |
| Glycerol | 5 |
| Tris(hydroxymethyl)methylamine | 0.2 |
| Proxel ® GXL | 0.2 |
| Surfynol ® 465 | 0.2 |
| Direct Black 19 | 6 |
| Water | Balance |

TABLE B

Cyan Ink 1

| Components | Batch wt % |
|---|---|
| Diethylene Glycol | 12 |
| 2-Pyrrolidone | 8 |
| Glycerol | 5 |
| Tris(hydroxymethyl)methylamine | 0.2 |
| Proxel ® GXL | 0.2 |
| Surfynol ® 465 | 0.2 |
| Acid Blue 9 | 5 |
| Water | Balance |

TABLE C

Magenta Ink 1

| Components | Batch wt % |
|---|---|
| Diethylene Glycol | 12 |
| 2-Pyrrolidone | 8 |
| Glycerol | 5 |
| Tris(hydroxymethyl)methylamine | 0.2 |
| Proxel ® GXL | 0.2 |
| Surfynol ® 465 | 0.2 |
| Acid Red 52 | 5 |
| Water | Balance |

TABLE D

Yellow Ink 1

| Components | Batch wt % |
|---|---|
| Diethylene Glycol | 12 |
| 2-Pyrrolidone | 8 |
| Glycerol | 5 |
| Tris(hydroxymethyl)methylamine | 0.2 |
| Proxel ® GXL | 0.2 |
| Surfynol ® 465 | 0.2 |
| Pro-Jet ® Yellow 746 | 4 |
| Water | Balance |

TABLE E

Black Ink 2

| Components | Batch wt % |
|---|---|
| Ethylene Glycol | 10 |
| 2-Pyrrolidone | 7 |
| Glycerol | 3 |
| Diethylene Glycol | 5 |
| Tris(hydroxymethyl)methylamine | 0.2 |
| Proxel ® GXL | 0.2 |
| Surfynol ® 465 | 0.2 |
| Food Black 2 | 7 |
| Water | Balance |

All inks formulated had a pH in the range of 6-8.

All dyes contained a mixture counterions, which include sodium and potassium ions.

Table 1 shows the corrosion rates for the five inks tested. Deionized water (DIW) was also tested by way of a control.

TABLE 1

Silicon Nitride Corrosion Rates for Colored Inks

| Test No. | Test Fluid | Corrosion Rate (Angstroms per hr) |
|---|---|---|
| 1 | Black Ink 1 | 10.74 |
| 2 | Cyan Ink 1 | 21.86 |
| 3 | Magenta Ink 1 | 0.13 |
| 4 | Yellow Ink 1 | 2.04 |
| 5 | Black Ink 2 | 34.62 |
| 6 | DIW | 0.1 |

From Table 1, it can be seen that Black Ink 1, Cyan Ink 1 and Black Ink 2 are the most corrosive towards silicon nitride. Yellow Ink 1 had a moderate corrosion rate while the magenta ink and deionized water did not corrode silicon nitride by any appreciable amount. These results were broadly consistent with SEM observations of printheads, in which cyan and black ink channels appeared to show the most corrosion of the silicon nitride roof layer.

1.2 Effect of pH on Silicon Nitride Corrosion Rates

The effect of pH on silicon nitride corrosion rates was investigated. Accordingly, the black ink and deionized water were tested at pH10 (by the addition of ammonium hydroxide) and pH1 (by the addition of hydrochloric acid). Table 2 shows the corrosions rates at these extreme pHs (Test Nos. 1 and 6 from Table 1 have been included for comparison).

TABLE 2

Effect of pH on Silicon Nitride Corrosion Rates

| Test No. | Test Fluid | Corrosion Rate (Angstroms per hr) |
|---|---|---|
| 1 | Black Ink 1 | 10.74 |
| 7 | Black Ink 1 @ pH10 | 20.58 |
| 8 | Black Ink 1 @ pH1 | 0.13 |
| 6 | DIW | 0.01 |
| 9 | DIW @ pH10 | 11.95 |
| 10 | DIW @ pH1 | 0.01 |

As expected, the high pH test fluids were very corrosive towards silicon nitride whereas the low pH test fluids were not corrosive at all.

1.3 Effect of Soluble Al(III) on Silicon Nitride Corrosion Rates

Table 3 shows the corrosions rates for Black Ink 1 spiked with varying amounts of aluminium by the addition of water-soluble aluminium nitrate nonahydrate (Test No. 1 from Table 1 has been included for comparison).

TABLE 3

Effect of Soluble Al(III) Ions on Silicon Nitride Corrosion Rates for Black Ink 1

| Test No. | Test Fluid | Corrosion Rate (Angstroms per hr) |
|---|---|---|
| 1 | Black Ink 1 | 10.74 |
| 17 | Black Ink 1 + 0.01 ppm Al | 7.64 |
| 18 | Black Ink 1 + 0.1 ppm Al | 1.50 |
| 19 | Black Ink 1 + 1 ppm Al | 0.05 |
| 20 | Black Ink 1 + 10 ppm Al | 0.05 |
| 21 | Black Ink 1 + 100 ppm Al | −0.63 |

As can be seen from the data in Table 1, the addition of soluble trivalent aluminium ions to Black Ink 1 surprisingly produces a dramatic effect in reducing the corrosion rate of silicon nitride. At an Al concentration of 1 ppm or more, corrosion of silicon nitride is completely inhibited. Even at lower concentrations of Al, the rate of corrosion is markedly diminished.

With this positive result using Black Ink 1, the other colored inks described above were tested to investigate the effects of adding aluminium nitrate nonahydrate on corrosion rates. Table 4 shows the test results for cyan, magenta and yellow inks (Test Nos. 2, 3 and 4 from Table 1 have been included for comparison).

TABLE 4

Effect of Soluble Al(III) Ions on Silicon Nitride Corrosion Rates for Cyan, Magenta and Yellow Inks

| Test No. | Test Fluid | Corrosion Rate (Angstroms per hr) |
|---|---|---|
| 2 | Cyan Ink 1 | 21.86 |
| 22 | Cyan Ink 1 + 0.1 ppm Al | 8.23 |
| 23 | Cyan Ink 1 + 1 ppm Al | 0.12 |
| 24 | Cyan Ink 1 + 5 ppm Al | −0.01 |
| 25 | Cyan Ink 1 + 10 ppm Al | 0.06 |
| 26 | Cyan Ink 1 + 50 ppm Al | 0.14 |
| 27 | Cyan Ink 1 + 100 ppm Al | −0.24 |
| 3 | Magenta Ink 1 | 0.13 |
| 28 | Magenta Ink 1 + 0.1 ppm Al | −0.05 |
| 29 | Magenta Ink 1 + 1 ppm Al | 0.12 |
| 30 | Magenta Ink 1 + 10 ppm Al | −0.14 |
| 4 | Yellow Ink 1 | 2.04 |
| 31 | Yellow Ink 1 + 0.1 ppm Al | 0.04 |
| 32 | Yellow Ink 1 + 0.1 ppm Al | 0.01 |
| 33 | Yellow Ink 1 + 0.1 ppm Al | −0.02 |

As evidenced by the data in Table 5, the corrosiveness of all inks tested was minimized by the addition of relatively small quantities of aluminium.

The effect of aluminium nitrate spiking was also investigated on the particularly corrosive Black Ink 2. Hitherto, Black Ink 2 had been considered as potentially too corrosive towards silicon nitride to be used in printheads. Table 5 shows the test results for Black Ink 2, both untreated and spiked with aluminium nitrate nonahydrate.

TABLE 5

Effect of Soluble Al(III) Ions on Silicon Nitride Corrosion Rates for Black Ink 2

| Test No. | Test Fluid | Corrosion Rate (Angstroms per hr) |
|---|---|---|
| 5 | Black Ink 2 | 34.62 |
| 34 | Black Ink 2 + 1 ppm Al | 34.04 |

TABLE 5-continued

Effect of Soluble Al(III) Ions on Silicon Nitride
Corrosion Rates for Black Ink 2

| Test No. | Test Fluid | Corrosion Rate (Angstroms per hr) |
|---|---|---|
| 35 | Black Ink 2 + 10 ppm Al | 25.50 |
| 36 | Black Ink 2 + 100 ppm Al | −0.18 |

Although, compared to other inks tested, higher quantities of aluminium were required in order to fully inhibit silicon nitride corrosion, Table 5 demonstrates the effectiveness of aluminium spiking even in highly corrosive inks.

Given the positive results from Al(III), it was anticipated that other Al(III) sources would be effective in reducing the rate of silicon nitride corrosion. Alternative Al(III) sources include common alum and aluminium sulfate. Other Al(III) sources will be readily apparent to the person skilled in the art.

1.4 Effect of Other Additives on Silicon Nitride Corrosion Rates

Soluble borax (sodium tetraborate decahydrate), insoluble alumina and soluble iron were investigated as alternative additives for inhibiting corrosion of silicon nitride. The test results for borax, alumina and iron are shown in Tables 6, 7 and 8, respectively. (Test Nos. 1, 2 and 5 from Table 1 have been included for comparison, where appropriate).

TABLE 6

Effect of Borax on Silicon Nitride Corrosion Rates

| Test No. | Test Fluid | Corrosion Rate (Angstroms per hr) |
|---|---|---|
| 1 | Black Ink 1 | 10.74 |
| 37 | Black Ink 1 + 1 ppm B | 15.10 |
| 38 | Black Ink 1 + 10 ppm B | 9.28 |
| 39 | Black Ink 1 + 100 ppm B | 12.07 |
| 5 | Black Ink 2 | 34.62 |
| 40 | Black Ink 2 + 1 ppm B | 31.12 |
| 41 | Black Ink 2 + 10 ppm B | 35.58 |
| 42 | Black Ink 2 + 100 ppm B | 47.65 |

TABLE 7

Effect of Alumina on Silicon Nitride Corrosion Rates

| Test No. | Test Fluid | Corrosion Rate (Angstroms per hr) |
|---|---|---|
| 1 | Black Ink 1 | 10.74 |
| 43 | Black Ink 1 + 0.001 g/l Al | 16.01 |
| 44 | Black Ink 1 + 0.01 g/l Al | 14.61 |
| 45 | Black Ink 1 + 0.1 g/l Al | 14.41 |
| 46 | Black Ink 1 + 1 g/l Al | 3.14 |

TABLE 8

Effect of Iron on Silicon Nitride Corrosion Rates

| Test No. | Test Fluid | Corrosion Rate (Angstroms per hr) |
|---|---|---|
| 2 | Cyan Ink 1 | 33.16 |
| 47 | Cyan Ink 1 + 100 ppm Fe (ammonium iron sulfate) | 6.06 |
| 48 | Cyan Ink 1 + 100 ppm Fe (iron sulfate heptahydrate) | 6.04 |

TABLE 8-continued

Effect of Iron on Silicon Nitride Corrosion Rates

| Test No. | Test Fluid | Corrosion Rate (Angstroms per hr) |
|---|---|---|
| 49 | Cyan Ink 1 + 100 ppm Fe (iron chloride) | 4.20 |
| 50 | Cyan Ink 1 + 100 ppm Fe (iron bromide) | 5.39 |

Table 6 demonstrates that boron in the form of borax apparently has no effect in suppressing silicon nitride corrosion.

Table 7 demonstrates that alumina has some effect in reducing silicon nitride corrosion, albeit only in relatively high quantities (about 1 gram per liter).

Table 8 demonstrates that Fe(III) is effective in suppressing silicon nitride corrosion, irrespective of the iron salt used as the additive. However, Fe(III) is generally not as effective as Al(III) in suppressing silicon nitride corrosion.

Mixtures of 100 ppm Fe(III) and 100 pm Al(III) were also found to be highly effective in reducing the rate of silicon nitride corrosion, presumably due to the presence of Al(III). Notably, the inhibiting effects of Al(III) were not diminished by the presence of Fe(III).

1.5 Effect of Aluminium Metal on Silicon Nitride Corrosion Rates

Whilst spiking inks with aluminium (e.g. aluminium nitrate) is an attractive means for inhibiting silicon nitride corrosion, the effectiveness of such low quantities of aluminium led the present Applicant to investigate aluminium foil as a possible means for inhibiting silicon nitride corrosion. It was considered that aluminium foil could infuse sufficient quantities of Al(III) ions into the ink in order to suppress silicon nitride corrosion. Such an approach would potentially obviate the need to formulate customized inks spiked with aluminium, or at least provide an alternative to these customized inks.

Various test fluids were immersed in the plastic soak vessel together with aluminium foil, in accordance with the methodology described above. Table 9 shows the results of these tests. (Test Nos. 1 and 5 from Table 1 have been included for comparison).

TABLE 9

Effect of Aluminium Foil on Silicon Nitride Corrosion Rates

| Test No. | Test Fluid | Corrosion Rate (Angstroms per hr) |
|---|---|---|
| 1 | Black Ink 1 | 10.74 |
| 51 | Black Ink 1 + 10 cm$^2$ Al foil | 0.03 |
| 52 | Black Ink 1 + 100 cm$^2$ Al foil | 0.01 |
| 5 | Black Ink 2 | 34.62 |
| 53 | Black Ink 2 + 10 cm$^2$ Al foil | 31.45 |
| 54 | Black Ink 2 + 100 cm$^2$ Al foil | −0.16 |

The data presented in Table 9 demonstrate that exposure of test fluids to aluminium metal is highly effective in inhibiting corrosion of silicon nitride. For example, inks formulated with elemental aluminium particles are very effective in minimizing corrosiveness.

More significantly, the data presented in Table 9 has ramifications for the design of inkjet printers and cartridges. If ink is exposed to an aluminium surface upstream of a printhead, then this ink will have minimal corrosiveness towards silicon nitride in the printhead, even if it is an 'untreated' ink (i.e. an ink not specifically formulated with any aluminium additives).

There are potentially many different parts of a printer's fluidic pathway where an aluminium surface may be incorporated. For example, aluminium may be incorporated into an ink cartridge, ink lines/couplings, inline filter(s), pump(s), a pressure-regulating chamber positioned between the ink cartridge and the printhead, an ink manifold for delivering ink to inlets of the printhead, or the printhead itself (e.g. an aluminium layer in each nozzle chamber, which can be deposited by PECVD during MEMS fabrication).

Although a laminar sheet of aluminium foil was employed in Test Nos. 51-54, it will be appreciated that the aluminium may have any suitable configuration provided that is exposed to the ink. For example, an aluminium mesh or sponge may be preferred in some instances for maximizing a surface area of aluminium exposed to the ink.

1.6 Inkjet Printer Fluidics System Incorporating Exposed Aluminium Metal

Inkjet printers incorporating the Applicant's inkjet printheads are described in, for example, U.S. Pat. No. 7,201,468; U.S. Pat. No. 7,360,861; U.S. Pat. No. 7,380,910; and U.S. Pat. No. 7,357,496, the contents of each of which are herein incorporated by reference.

Figure 7:
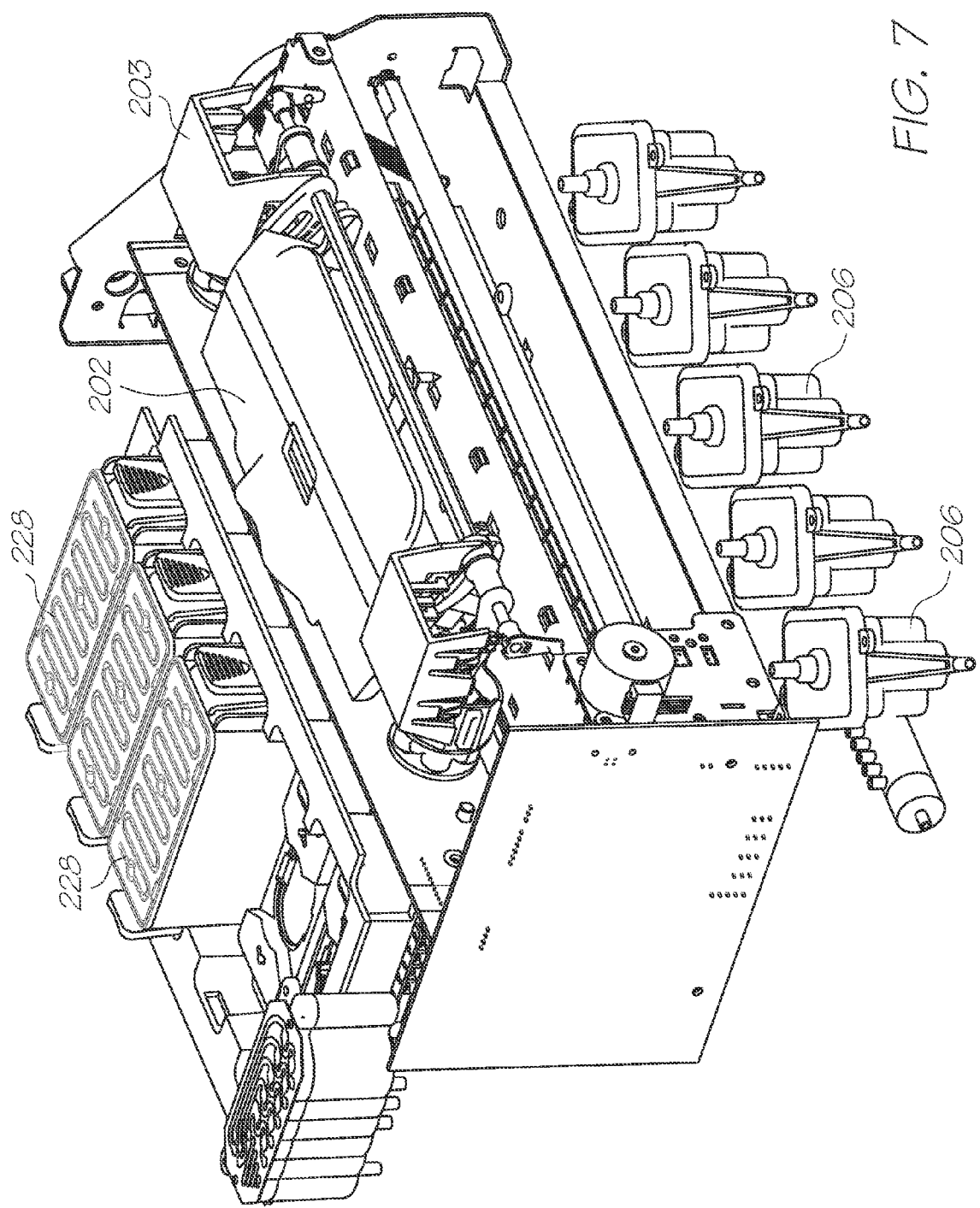
FIG. 7 is perspective view of an inkjet print engine.

FIG. 7 shows a thermal inkjet printer comprising a print engine 203, as described in Applicant's U.S. application Ser. No. 12/062,514, the contents of which is herein incorporated by reference. The printer includes a removable print cartridge 202, comprising a pagewidth printhead, and a bank of user-replaceable ink cartridges 228. Each color channel typically has its own ink reservoir 228 and a corresponding pressure-regulating chamber 206 for regulation of a hydrostatic pressure of ink supplied to the printhead. Hence, the printer has five ink reservoirs 228 and five corresponding pressure-regulating chambers 206. Typical color channel configurations for this five-channel print engine 203 are CMYKK or CMYK (IR). Each ink cartridge 228 may comprise an inkjet ink as described herein.

Although fluidic connections between the various components are not shown in FIG. 7, it will be appreciated that these connections are made with suitable hoses in accordance with the fluidics system described in, for example, U.S. application Ser. No. 12/062,514.

Figure 8:
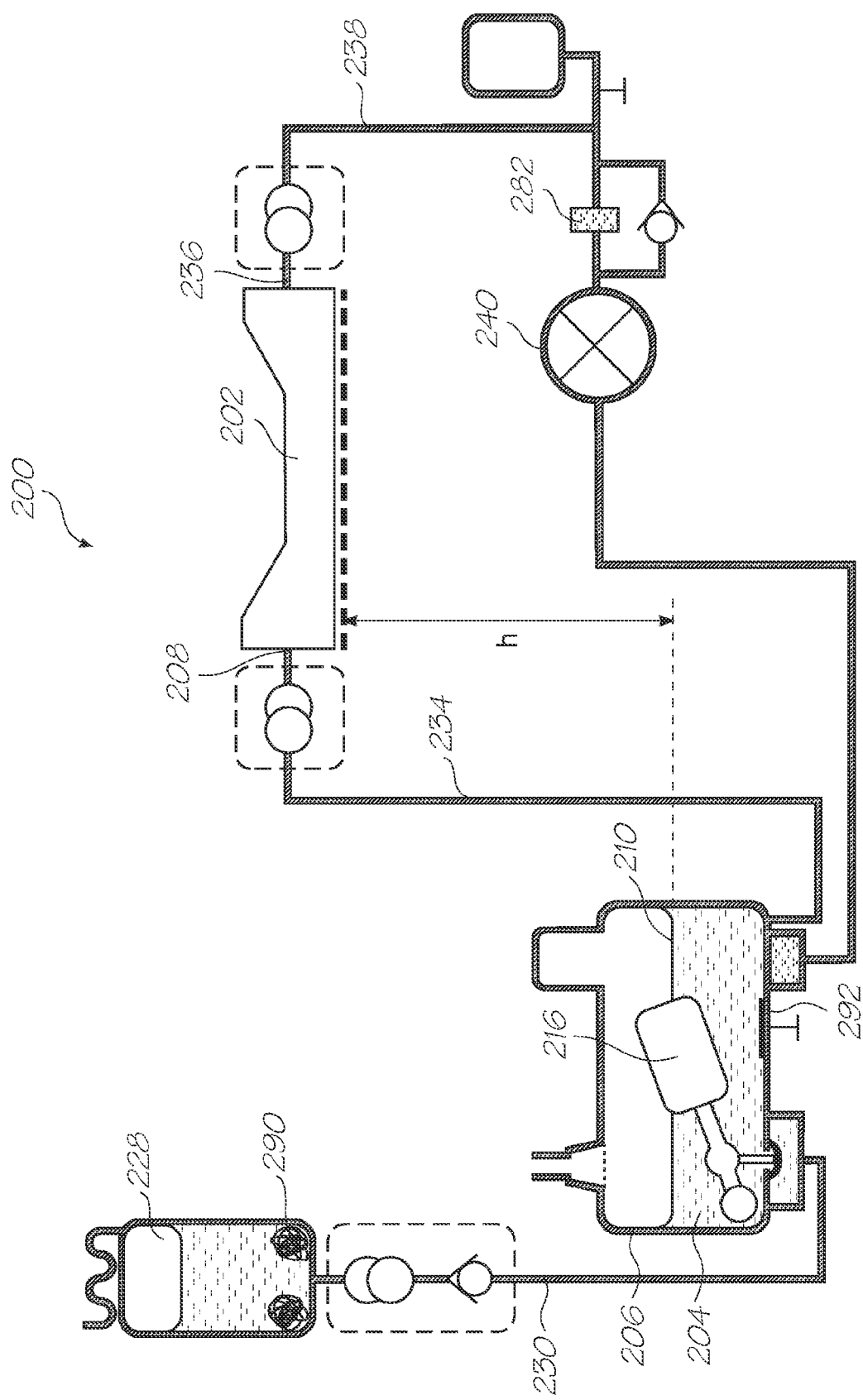
FIG. 8 is a schematic view of a fluidics system incorporating exposed aluminium.

FIG. 8 shows schematically a fluidics system 200 of the printer shown in FIG. 7. Several components of the fluidics system 200 have been modified to incorporate aluminium, which is exposed to ink delivered by the system to the print cartridge 202.

Referring then to FIG. 8, the pressure-regulating chamber 206 supplies ink 204 to an ink inlet 208 of the print cartridge 202 via an upstream ink line 234. The pressure-regulating chamber 206 is positioned below the print cartridge 202 and maintains a predetermined set level 210 of ink therein by means of a float valve. 216 The pressure-regulating chamber 206 includes a layer of aluminium 292, which is exposed to the ink 204 contained in the chamber.

Ink 204 is supplied to the pressure-regulating chamber 206 by the ink reservoir 228 positioned at any height h above the set level 210. The ink reservoir 228 is typically a user-replaceable ink tank or ink cartridge, which connects with an ink supply line 230 when installed in the printer. The ink supply line 230 provides fluidic communication between the ink reservoir 228 and an inlet port of the pressure-regulating chamber 206.

The ink reservoir 228 comprises an aluminium sponge 290, which provides a large surface area of aluminium exposed to ink contained therein. Of course, other configurations of aluminium (e.g. sheet, mesh etc) are equally possible.

The printhead cartridge 202 shown in FIG. 8 also has an ink outlet 236, which is connected to a downstream ink line 238. The downstream ink line 238 is connected to a return port of the chamber 206 and comprises an inline ink pump 240 and filter 282. The filter 282 may comprise an aluminium mesh, which is exposed to ink returned to the chamber 202. Equally, the ink pump 240 may comprise aluminium exposed to the ink 204.

From the foregoing, it will be appreciated that one or more components of the fluidic system 200 may be modified to incorporate aluminium which is exposed to ink supplied to the printhead.

Figure 9:
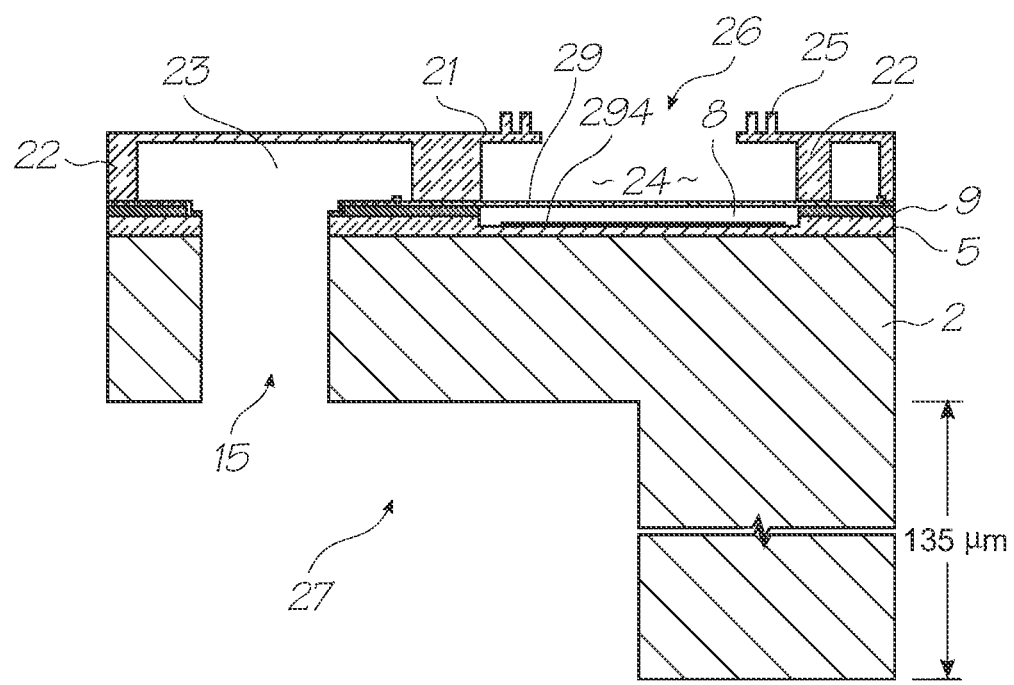
FIG. 9 is a side view of a thermal bubble-forming inkjet nozzle incorporating a layer of aluminium.

Likewise, the nozzle assembly shown in FIG. 2 may be modified to incorporate a layer of aluminium metal 294 inside the nozzle chamber 24. A suitably modified nozzle assembly is shown in FIG. 9 having a layer of aluminium metal 294 deposited in the pit 8 below the heater element 29. However, it will be appreciated that aluminium may be incorporated anywhere inside the nozzle chamber 24, or indeed the print cartridge 202 comprising the printhead and ink manifold.

An advantage of incorporating aluminium into the nozzle chamber 24 is its proximity to the silicon nitride structures. A disadvantage of incorporating aluminium into the nozzle chamber 24 is that it requires modification of established MEMS fabrication processes, albeit a relatively minor modification which does not significantly change the nozzle design.

2. BPSG Corrosion

The corrosiveness of certain dye-based inks towards BPSG was investigated. Further, the advantageous effects of metal additives in suppressing this corrosion were demonstrated.

BPSG coupons were prepared analogously to the silicon nitride coupons described above. The BPSG coupons were exposed to a variety of dye-based inks using the same methodology described above in connection with silicon nitride coupons.

2.1 Colored Ink BPSG Corrosion Rates

Initially, the range of colored ink formulations were tested for their BPSG corrosion rates. Table 10 shows the BPSG corrosion rates for the inks tested.

TABLE 10

BPSG Corrosion Rates for Colored Inks

| Test No. | Test Fluid | Corrosion Rate (Angstroms per hr) |
|---|---|---|
| 55 | Cyan Ink 1 | 41.84 |
| 56 | Magenta Ink 1 | 38.87 |
| 57 | Yellow Ink 1 | 30.25 |
| 58 | Black Ink 1 | 32.20 |

From Table 1, it can be seen that all inks tested were corrosive towards BPSG, consistent with SEM microscopy observation on actual printheads.

2.2 Effect of Soluble Al(III) on BPSG Corrosion Rates

Table 11 shows the corrosions rates for the range of colored inks when spiked with varying amounts of aluminium by the addition of water-soluble aluminium nitrate nonahydrate.

TABLE 11

Effect of Soluble Al(III) Ions on BPSG Corrosion Rates for Cyan, Magenta, Yellow and Black Inks

| Test No. | Test Fluid | Corrosion Rate (Angstroms per hr) |
|---|---|---|
| 55 | Cyan Ink 1 | 41.84 |
| 59 | Cyan Ink 1 + 1 ppm Al | 40.99 |
| 60 | Cyan Ink 1 + 2 ppm Al | 28.52 |
| 61 | Cyan Ink 1 + 5 ppm Al | 13.19 |
| 62 | Cyan Ink 1 + 10 ppm Al | 13.57 |
| 63 | Cyan Ink 1 + 20 ppm Al | −0.97 |
| 64 | Cyan Ink 1 + 50 ppm Al | −0.09 |
| 65 | Cyan Ink 1 + 100 ppm Al | −0.95 |
| 56 | Magenta Ink 1 | 38.87 |
| 66 | Magenta Ink 1 + 1 ppm Al | 5.58 |
| 67 | Magenta Ink 1 + 2 ppm Al | −0.36 |
| 68 | Magenta Ink 1 + 5 ppm Al | −0.05 |
| 69 | Magenta Ink 1 + 10 ppm Al | 0.28 |
| 70 | Magenta Ink 1 + 20 ppm Al | −1.08 |
| 71 | Magenta Ink 1 + 50 ppm Al | −2.04 |
| 72 | Magenta Ink 1 + 100 ppm Al | −3.49 |
| 57 | Yellow Ink 1 | 30.25 |
| 73 | Yellow Ink 1 + 1 ppm Al | −0.23 |
| 74 | Yellow Ink 1 + 2 ppm Al | −0.10 |
| 75 | Yellow Ink 1 + 5 ppm Al | −0.42 |
| 76 | Yellow Ink 1 + 10 ppm Al | −1.29 |
| 77 | Yellow Ink 1 + 20 ppm Al | −0.43 |
| 78 | Yellow Ink 1 + 50 ppm Al | −0.07 |
| 79 | Yellow Ink 1 + 100 ppm Al | −0.26 |
| 58 | Black Ink 1 | 32.20 |
| 80 | Black Ink 1 + 1 ppm Al | −0.01 |
| 81 | Black Ink 1 + 2 ppm Al | 1.18 |
| 82 | Black Ink 1 + 5 ppm Al | 0.64 |
| 83 | Black Ink 1 + 10 ppm Al | −0.39 |
| 84 | Black Ink 1 + 20 ppm Al | 0.04 |
| 85 | Black Ink 1 + 50 ppm Al | −0.14 |
| 86 | Black Ink 1 + 100 ppm Al | −0.51 |

As evidenced by the data in Table 11, the corrosiveness towards BPSG of all inks tested was minimized by the addition of relatively small quantities of aluminium. At 20 ppm aluminium and above, all inks tested were rendered benign towards BPSG.

2.3 Effect of Soluble Fe(III) on BPSG Corrosion Rates

Table 12 shows the corrosions rates towards BPSG for the range of colored inks when spiked with varying amounts of iron by the addition of water-soluble ammonium iron sulfate.

TABLE 12

Effect of Soluble Fe(III) Ions on BPSG Corrosion Rates for Cyan, Magenta, Yellow and Black Inks

| Test No. | Test Fluid | Corrosion Rate (Angstroms per hr) |
|---|---|---|
| 55 | Cyan Ink 1 | 41.84 |
| 87 | Cyan Ink 1 + 1 ppm Fe | 41.79 |
| 89 | Cyan Ink 1 + 5 ppm Fe | 0.56 |
| 90 | Cyan Ink 1 + 10 ppm Fe | 0.26 |
| 91 | Cyan Ink 1 + 20 ppm Fe | 4.17 |
| 92 | Cyan Ink 1 + 50 ppm Fe | −0.80 |
| 93 | Cyan Ink 1 + 100 ppm Fe | −1.99 |
| 56 | Magenta Ink 1 | 38.87 |
| 94 | Magenta Ink 1 + 1 ppm Fe | 43.51 |
| 96 | Magenta Ink 1 + 5 ppm Fe | 44.90 |
| 97 | Magenta Ink 1 + 10 ppm Fe | 40.24 |
| 98 | Magenta Ink 1 + 20 ppm Fe | 17.05 |
| 99 | Magenta Ink 1 + 50 ppm Fe | 8.97 |
| 100 | Magenta Ink 1 + 100 ppm Fe | −1.15 |
| 57 | Yellow Ink 1 | 30.25 |
| 101 | Yellow Ink 1 + 1 ppm Fe | 0.84 |
| 103 | Yellow Ink 1 + 5 ppm Fe | 0.17 |
| 104 | Yellow Ink 1 + 10 ppm Fe | 0.59 |
| 105 | Yellow Ink 1 + 20 ppm Fe | 0.04 |
| 106 | Yellow Ink 1 + 50 ppm Fe | −0.13 |
| 107 | Yellow Ink 1 + 100 ppm Fe | −0.35 |
| 58 | Black Ink 1 | 32.20 |
| 108 | Black Ink 1 + 1 ppm Fe | 21.09 |
| 110 | Black Ink 1 + 5 ppm Fe | −0.22 |
| 111 | Black Ink 1 + 10 ppm Fe | 0.98 |
| 112 | Black Ink 1 + 20 ppm Fe | 2.91 |
| 113 | Black Ink 1 + 50 ppm Fe | 0.30 |
| 114 | Black Ink 1 + 100 ppm Fe | −0.28 |

As evidenced by the data in Table 12, the corrosiveness towards BPSG of all inks tested was minimized by the addition of relatively small quantities of iron. At 100 ppm iron, all inks tested were rendered benign towards BPSG.

2.4 Effect of Different Fe(III) Salts on BPSG Corrosion Rates

Table 13 shows the corrosion rates towards BPSG for the cyan ink when spiked with 100 ppm of Fe(III) from different soluble iron salts.

TABLE 13

Effect of Different Fe(III) Salts on BPSG Corrosion Rates for Cyan Ink

| Test No. | Test Fluid | Corrosion Rate (Angstroms per hr) |
|---|---|---|
| 55 | Cyan Ink 1 | 41.84 |
| 93 | Cyan Ink 1 + 100 ppm Fe (ammonium iron sulfate) | −1.99 |
| 116 | Cyan Ink 1 + 100 ppm Fe (iron sulfate heptahydrate) | −1.52 |
| 117 | Cyan Ink 1 + 100 ppm Fe (iron chloride) | −0.46 |
| 118 | Cyan Ink 1 + 100 ppm Fe (iron bromide) | −0.72 |

Table 13 demonstrates that the cyan ink was rendered benign towards BPSG by the addition of 100 ppm Fe(III), irrespective of the source of the Fe(III) ions.

2.5 Effect of Other Metal Salts on BPSG Corrosion Rates

As foreshadowed above, it was postulated that the mechanism of corrosion inhibition relied on the formation of insoluble phosphate salts at the BPSG surface, which form a passivating layer that protects the BPSG from corrosion. To this end, a number of other metal additives were surveyed in accordance with their known metal phosphate solubilities.

Table 14 shows the corrosions rates towards BPSG for the magenta ink when spiked with 100 ppm of metal from a variety of different metal salts. The solubility of the corresponding metal phosphate is also shown in Table 14. (The results from Test Nos. 56, 72 and 100 have been included in Table 14 by way of comparison)

TABLE 14

Effect of Different Metal Salts on BPSG Corrosion Rates for Magenta Ink

| Test No. | Test Fluid | Metal Phosphate Solubility (g/L) | Corrosion Rate (Angstroms per hr) |
|---|---|---|---|
| 56 | Magenta Ink 1 | | 38.87 |
| 72 | Magenta Ink 1 + 100 ppm Al (aluminium nitrate nonhydrate) | $9.42 \times 10^{-9}$ | −3.49 |

TABLE 14-continued

Effect of Different Metal Salts on BPSG Corrosion Rates for Magenta Ink

| Test No. | Test Fluid | Metal Phosphate Solubility (g/L) | Corrosion Rate (Angstroms per hr) |
|---|---|---|---|
| 100 | Magenta Ink 1 + 100 ppm Fe (ammonium iron sulfate) | $2.99 \times 10^{-6}$ | −1.15 |
| 119 | Magenta Ink 1 + 100 ppm Cu (copper(II) nitrate hydrate) | $3.17 \times 10^{-6}$ | −0.23 |
| 120 | Magenta Ink 1 + 100 ppm Bi (bismuth(III) nitrate pentahydrate) | $1.10 \times 10^{-10}$ | −0.67 |
| 121 | Magenta Ink 1 + 100 ppm Mg (magnesium nitrate hexahydrate) | $1.19 \times 10^{-3}$ | −0.13 |
| 122 | Magenta Ink 1 + 100 ppm Ag (silver nitrate) | $5.32 \times 10^{-3}$ | 0.62 |
| 123 | Magenta Ink 1 + 100 ppm Na (sodium nitrate) | 2.24 | 2.09 |

From Table 14, it can be seen that the most effective metal additives for suppressing BPSG corrosion have highly insoluble phosphates. Notably, aluminium, iron, copper and bismuth salts were all highly effective in suppressing BPSG corrosion. Moreover, examination of the BPSG surface after exposure to these inks revealed a smooth glossy surface, indicating that a uniform passivation layer had formed on the BPSG surface.

On the other hand, exposure of the BPSG surface to inks spiked with silver and sodium salts tended to result in a more pitted, non-uniform BPSG surface. This may indicate that the passivation layer was somewhat brittle and less effective in suppressing corrosion.

2.6 Effect of Dye Counterions on BPSG Corrosion Rates

The inks tested contained off-the-shelf dyes supplied with a mixture of counterions. The evidence from metal phosphate solubility studies led the present Applicant to consider the nature of the dye counterion as being responsible for the corrosiveness of certain dyes. Specifically, it was postulated that counterions which form relatively soluble phosphates (e.g. ammonium, potassium and sodium) would be more corrosive towards BPSG than counterions which form relatively insoluble phosphates (e.g. lithium and tetramethylammonium). Further, the benefits of metal additives in the ink would be best realized in inks containing counterions which form relatively soluble phosphates.

Accordingly, Black Ink 2 and Magenta Ink 1 were modified by ion exchange to produce inks containing only a single counterion. Table 15 shows the BPSG corrosion rates for mono-counterion black inks in the presence of varying amounts of an aluminium additive (aluminium nitrate nonahydrate). Table 16 shows the BPSG corrosion rates for mono-counterion magenta inks in the presence of varying amounts of the aluminium additive.

TABLE 15

Effect of Dye Counterions in Black 2 Ink on BPSG Corrosion Rates

| Test No. | Mono-Counterion | Metal Additive | Corrosion Rate (Angstroms per hr) |
|---|---|---|---|
| 124 | Potassium | None | 57.53 |
| 125 | Sodium | None | 41.39 |
| 126 | Lithium | None | 5.43 |
| 127 | TMA | None | 0.02 |
| 128 | Potassium | 1 ppm Al | 10.89 |
| 129 | Sodium | 1 ppm Al | 0.36 |
| 130 | Lithium | 1 ppm Al | 2.66 |
| 131 | TMA | 1 ppm Al | −0.64 |
| 132 | Potassium | 10 ppm Al | 0.80 |
| 133 | Sodium | 10 ppm Al | −0.24 |
| 134 | Lithium | 10 ppm Al | |
| 135 | TMA | 10 ppm Al | 0.34 |
| 136 | Potassium | 50 ppm Al | −1.23 |
| 137 | Sodium | 50 ppm Al | −1.29 |
| 138 | Lithium | 50 ppm Al | −0.37 |
| 139 | TMA | 50 ppm Al | −0.62 |
| 140 | Potassium | 100 ppm Al | −1.37 |
| 141 | Sodium | 100 ppm Al | −4.17 |
| 142 | Lithium | 100 ppm Al | −1.36 |
| 143 | TMA | 100 ppm Al | −0.66 |

TABLE 16

Effect of Dye Counterions in Magenta 1 Ink on BPSG Corrosion Rates

| Test No. | Mono-Counterion | Metal Additive | Corrosion Rate (Angstroms per hr) |
|---|---|---|---|
| 144 | Ammonium | None | 40.79 |
| 145 | Potassium | None | 32.45 |
| 146 | Sodium | None | 30.16 |
| 147 | Lithium | None | 0.30 |
| 148 | TMA | None | 0.24 |
| 149 | Ammonium | 1 ppm Al | 14.73 |
| 150 | Potassium | 1 ppm Al | 6.60 |
| 151 | Sodium | 1 ppm Al | −0.07 |
| 152 | Lithium | 1 ppm Al | −0.05 |
| 153 | TMA | 1 ppm Al | −0.31 |
| 154 | Ammonium | 10 ppm Al | 15.42 |
| 155 | Potassium | 10 ppm Al | −0.30 |
| 156 | Sodium | 10 ppm Al | −0.25 |
| 157 | Lithium | 10 ppm Al | −0.22 |
| 158 | TMA | 10 ppm Al | −0.47 |
| 159 | Ammonium | 50 ppm Al | −0.65 |
| 160 | Potassium | 50 ppm Al | −0.52 |
| 161 | Sodium | 50 ppm Al | −0.15 |
| 162 | Lithium | 50 ppm Al | −0.77 |
| 163 | TMA | 50 ppm Al | −3.01 |
| 164 | Ammonium | 100 ppm Al | −1.20 |
| 165 | Potassium | 100 ppm Al | −6.85 |
| 166 | Sodium | 100 ppm Al | −16.67 |
| 167 | Lithium | 100 ppm Al | −1.56 |
| 168 | TMA | 100 ppm Al | −6.78 |

The results in Tables 15 and 16 both demonstrate that the dye counterion is a significant factor controlling BPSG corrosion rates. The evidence from these experiments shows an order of BPSG corrosivity as follows:

Ammonium>Potassium>Sodium>>Lithium>TMA (tetramethylammonium)

A key finding is that inks containing potassium ions are highly corrosive towards BPSG. Furthermore, this corrosivity can be suppressed with the addition of sufficient quantities of a metal additive, such as aluminium nitrate.

Commercial inkjet dyes are often supplied with a mixture of dye counterions. Dyes containing potassium counterions in significant amounts are expected to be highly corrosive towards BPSG, whereas those containing, for example, only lithium ions are expected to be much less corrosive towards BPSG. The dye counterions have an important role in the overall balance of ink formulations. In many instances, it is not possible simply to switch to a less corrosive counterion (e.g. lithium) because this affects the solubility of the dye and may cause undesirable side-effects, such as precipitation of the dye in a printhead. It is an advantage of the present invention that inks containing corrosive counterions can be used without changing the composition of the dye. The addition of metal additives to the ink formulation in relatively small quantities has been shown to be remarkably effective in suppressing corrosion of BPSG structures.

3. Silicon Oxide Corrosion

The corrosiveness of a dye-based ink towards silicon oxide was investigated. Further, the advantageous effects of metal additives in suppressing this corrosion was demonstrated.

Silicon oxide coupons were prepared analogously to the silicon nitride coupons described above. The silicon oxide coupons were exposed to a variety of dye-based inks using the same methodology described above in connection with silicon nitride coupons.

3.1 Effect of Al(III) on Silicon Oxide Corrosion Rates

The cyan ink formulation was tested for its silicon oxide corrosion rate with and without an aluminium nonahydrate additive. The results are shown in Table 17.

TABLE 17

Silicon Oxide Corrosion Rate for Cyan Ink

| Test No. | Test Fluid | Corrosion Rate (Angstroms per hr) |
|---|---|---|
| 169 | Cyan Ink 1 | 3.55 |
| 170 | Cyan Ink 1 + 10 ppm Al | −1.00 |

From Table 17, it can be seen that the cyan ink has some corrosivity towards silicon oxide, albeit less than its corrosivity towards silicon nitride and BPSG. The additional of 10 ppm Al(III) was sufficient to suppress this corrosivity completely.

It will, of course, be appreciated that the present invention has been described by way of example only and that modifications of detail may be made within the scope of the invention, which is defined in the claims appended hereto.

The invention claimed is:

1. An inkjet printer comprising:
an inkjet printhead comprising at least one corrodible structure comprised of silicon nitride, borophosphosilicate glass (BPSG) or silicon oxide, said corrodible structure having a surface exposed to ink; and
an ink reservoir containing said ink, said ink reservoir being in fluid communication with said printhead,
wherein said ink comprises:
water;
an azo dye comprising one or more sulfonate groups and a potassium counterion; and
an Al(III) metal additive for minimizing corrosion of said exposed surface.

2. The inkjet printer of claim 1, wherein said metal additive comprises aluminium nitrate nonahydrate.

3. The inkjet printer of claim 1, wherein said metal additive is contained in said ink in a concentration in the range of 0.01 to 200 ppm.

4. The inkjet printer of claim 1, wherein said ink comprises 0.01 to 25 wt. % of said dye.

5. The inkjet printer of claim 1, wherein said printhead comprises a plurality of nozzle chambers, each nozzle chamber comprising at least one structure comprised of silicon nitride.

6. The inkjet printer of claim 5, wherein a roof of each nozzle chamber defines part of a nozzle plate for said printhead, wherein said nozzle plate is comprised of silicon nitride.

7. The inkjet printer of claim 1, wherein said printhead comprises a plurality of nozzle chambers, each nozzle chamber comprising at least one structure comprised of silicon oxide.

8. The inkjet printer of claim 1, wherein said printhead comprises CMOS layers having at least one layer of BPSG exposed to said ink.

9. The inkjet printer of claim 1, wherein said printhead comprises CMOS layers, having at least one layer of silicon oxide exposed to said ink.

10. The inkjet printer of claim 8, wherein said printhead comprises a plurality of ink inlets defined by openings through said CMOS layers.

11. A method of minimizing corrosion of at least one corrodible structure in a printhead, the corrodible structure being comprised of silicon nitride, borophosphosilicate glass (BPSG) or silicon oxide, the method comprising exposing a surface of the corrodible structure to an ink comprising:
water;
an azo dye comprising one or more sulfonate groups and a metal counterion; and
an Al(III) metal additive for minimizing corrosion of said exposed surface,
wherein an amount of Al (III) additive required to minimize corrosion by dyes absent potassium counterions is less than an amount of Al (III) additive required to minimize corrosion by dyes comprising potassium counterions.

12. An ink set comprising a plurality of different colored inks, each ink of the ink set comprising:
water; and
an azo dye having one or more sulfonate groups and a metal counterion,
wherein one or more of the inks comprises an Al(III) metal additive,
and wherein a first ink absent a potassium counterion comprises less Al(III) additive than a second ink comprising a potassium counterion.

* * * * *